(12) United States Patent
Besley

(10) Patent No.: US 10,875,459 B2
(45) Date of Patent: Dec. 29, 2020

(54) MODULAR OPEN SPACE ORGANIZER APPARATUS AND SYSTEM

(71) Applicant: Matthew Thomas Besley, Carlsbad, CA (US)

(72) Inventor: Matthew Thomas Besley, Carlsbad, CA (US)

( * ) Notice: Subject to any disclaimer, the term of this patent is extended or adjusted under 35 U.S.C. 154(b) by 136 days.

(21) Appl. No.: 16/117,502

(22) Filed: Aug. 30, 2018

(65) Prior Publication Data

US 2020/0070732 A1   Mar. 5, 2020

(51) Int. Cl.
*B60R 7/08* (2006.01)
*B60R 7/04* (2006.01)

(52) U.S. Cl.
CPC . *B60R 7/08* (2013.01); *B60R 7/04* (2013.01)

(58) Field of Classification Search
CPC .... B60R 7/04; B60R 7/08; B60R 7/02; B60R 5/006; B60R 5/047; B60R 2011/0007; A47B 61/06
See application file for complete search history.

(56) References Cited

U.S. PATENT DOCUMENTS

| | | | | |
|---|---|---|---|---|
| 4,226,348 A * | 10/1980 | Dottor | B60R 7/02 | 224/42.34 |
| 5,199,772 A * | 4/1993 | Jordan | B60R 11/0205 | 224/539 |
| 6,138,883 A * | 10/2000 | Jackson | B60R 9/00 | 224/404 |
| 6,851,735 B2 * | 2/2005 | Hicks | B60R 7/02 | 224/281 |
| 7,677,400 B2 * | 3/2010 | Bayazit | G02B 6/4452 | 211/26 |
| 7,731,026 B2 * | 6/2010 | Harrison | B60P 3/14 | 206/349 |
| 8,083,113 B2 * | 12/2011 | Klosk | B60R 7/02 | 224/539 |
| 8,210,592 B2 * | 7/2012 | Spitler | B60R 7/04 | 296/24.34 |
| 8,430,254 B2 * | 4/2013 | Kunis | A47B 61/00 | 211/189 |
| 8,500,183 B2 * | 8/2013 | Malley | B60R 7/02 | 224/401 |
| 8,505,794 B2 * | 8/2013 | Ardigo | B60R 7/08 | 224/543 |
| 9,738,227 B2 * | 8/2017 | Huebner | B60R 7/04 | |
| 9,764,692 B2 * | 9/2017 | Beere | B60R 7/08 | |
| 10,398,207 B2 * | 9/2019 | Schroeder | A45C 13/1069 | |
| 2006/0011686 A1 * | 1/2006 | Latham | B60R 7/04 | 224/579 |
| 2009/0014602 A1 * | 1/2009 | Frost | B60R 7/08 | 248/100 |
| 2013/0193179 A1 * | 8/2013 | Davidson | A45F 5/00 | 224/585 |
| 2013/0200645 A1 * | 8/2013 | Miller | B60P 7/0892 | 296/37.6 |
| 2018/0073676 A1 * | 3/2018 | Schroeder | B60R 11/00 | |
| 2019/0092213 A1 * | 3/2019 | Beenen | B65D 90/0053 | |
| 2019/0111849 A1 * | 4/2019 | Besley | B60R 7/04 | |
| 2019/0168678 A1 * | 6/2019 | Magnuson | B60R 7/08 | |

* cited by examiner

*Primary Examiner* — Bradley Duckworth
(74) *Attorney, Agent, or Firm* — Elie Gendloff; Gendloff IP

(57) ABSTRACT

A modular open space organizer (MOSO) apparatus and system that may be configured to be employed in various open storage areas where the MOSO system may include multiple, modular sections.

17 Claims, 26 Drawing Sheets

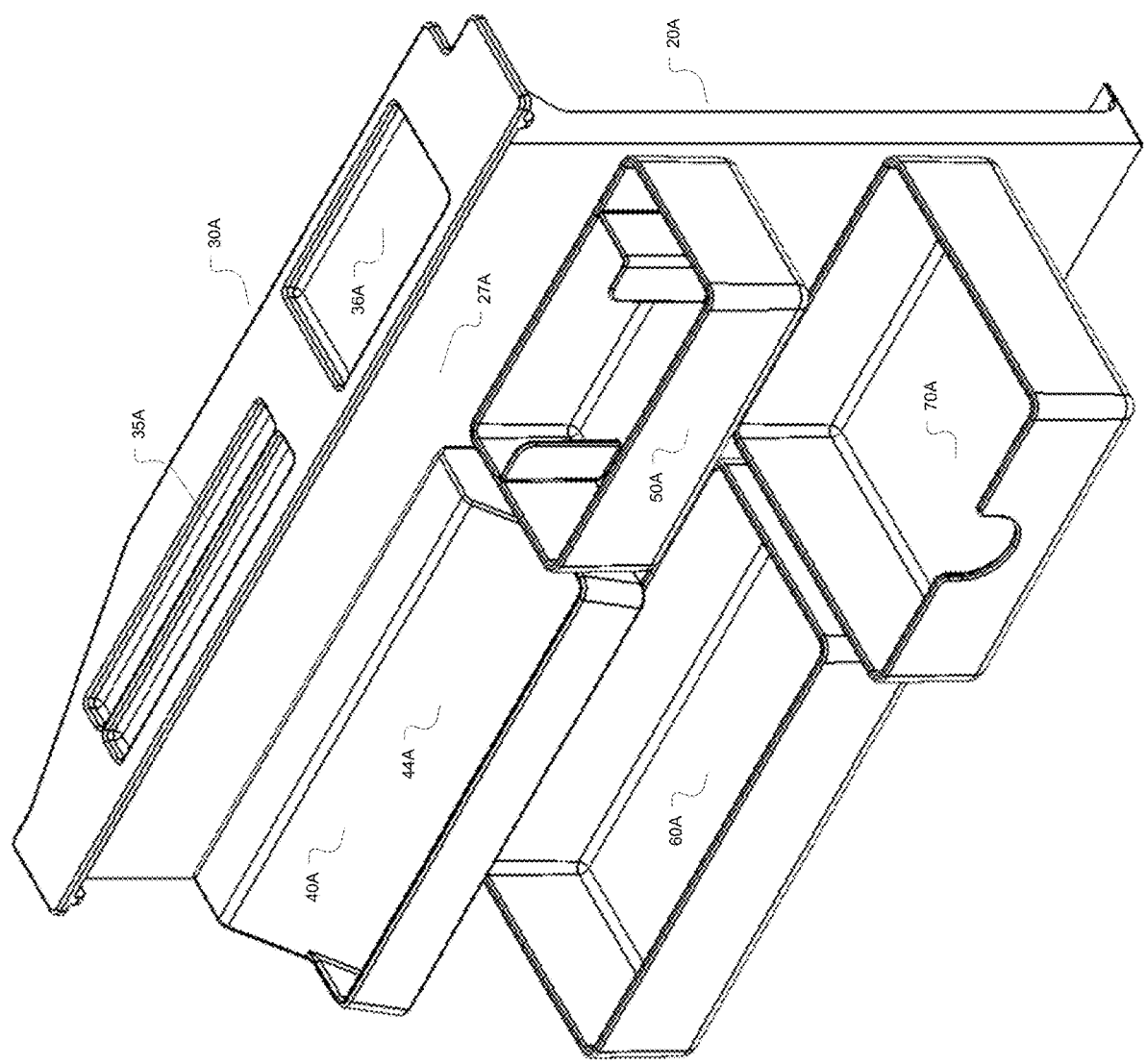

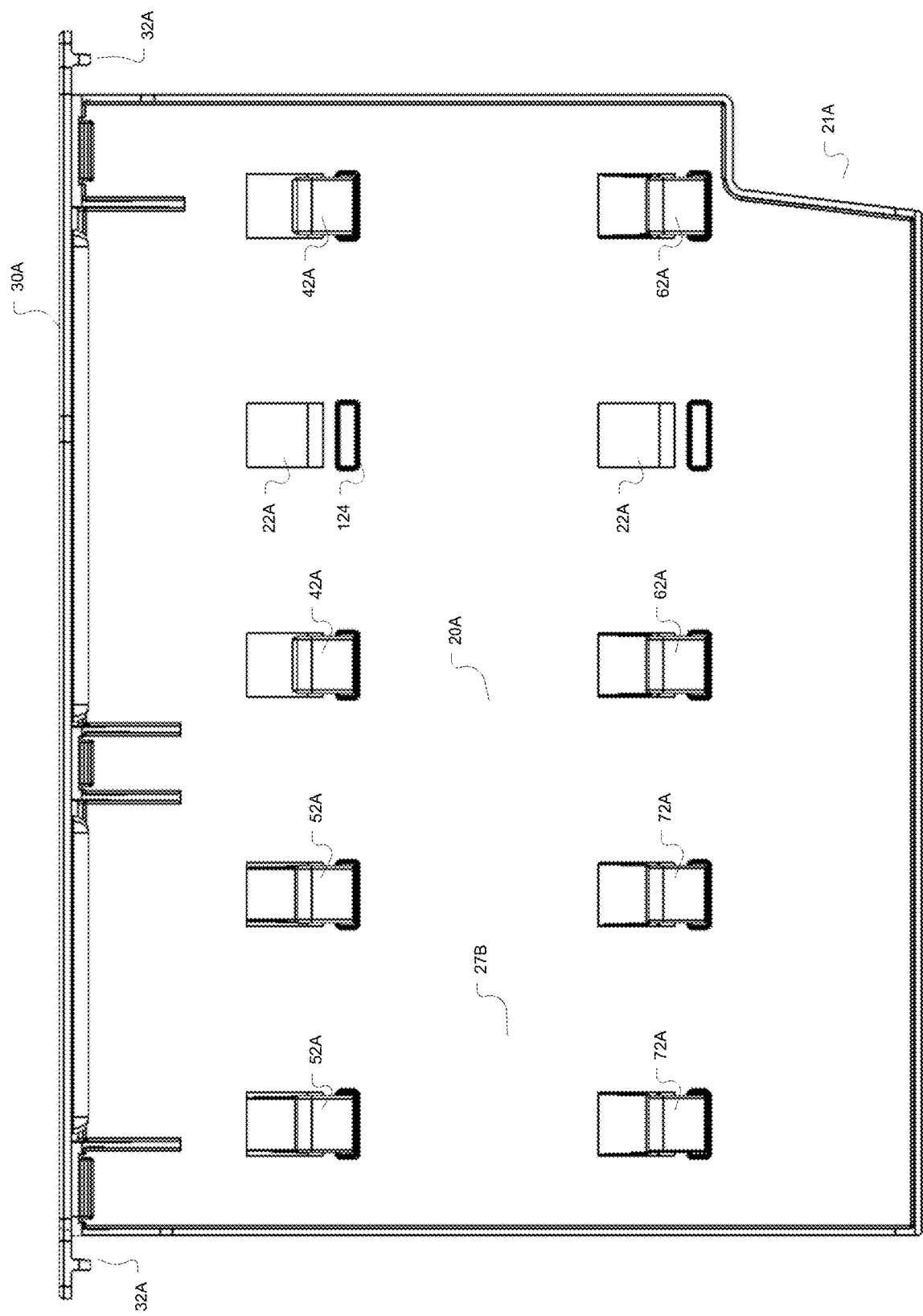

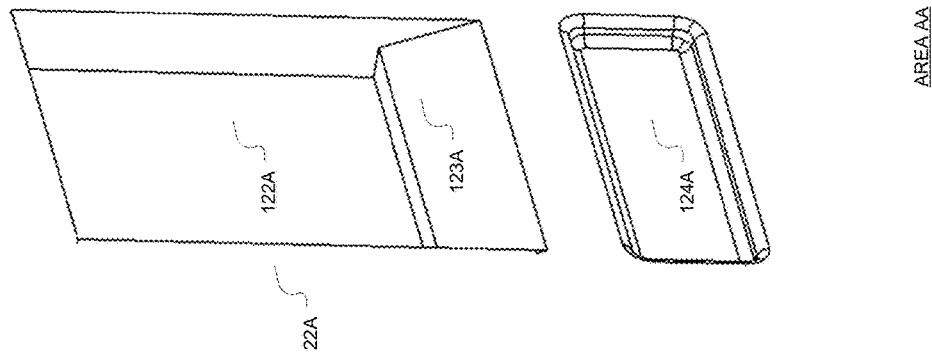
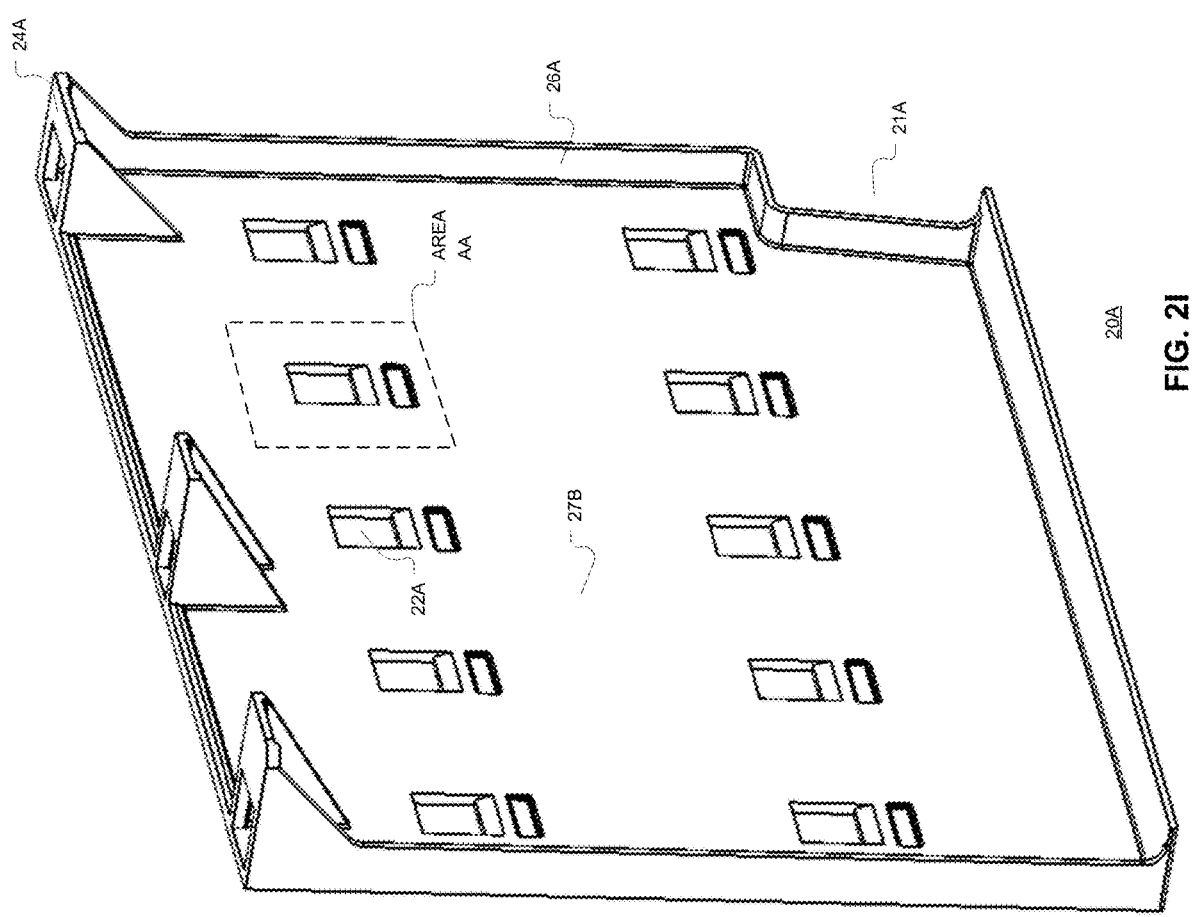

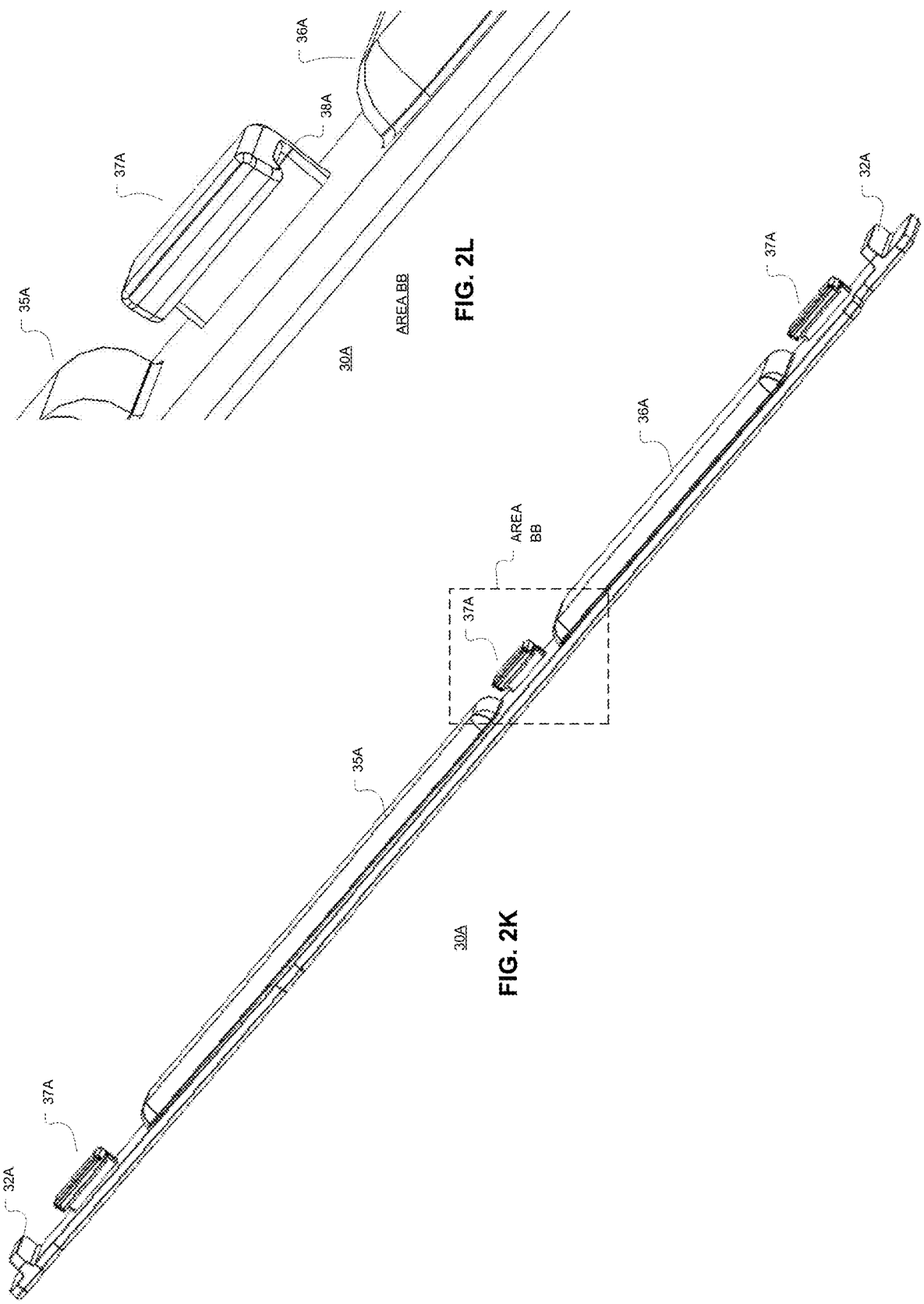

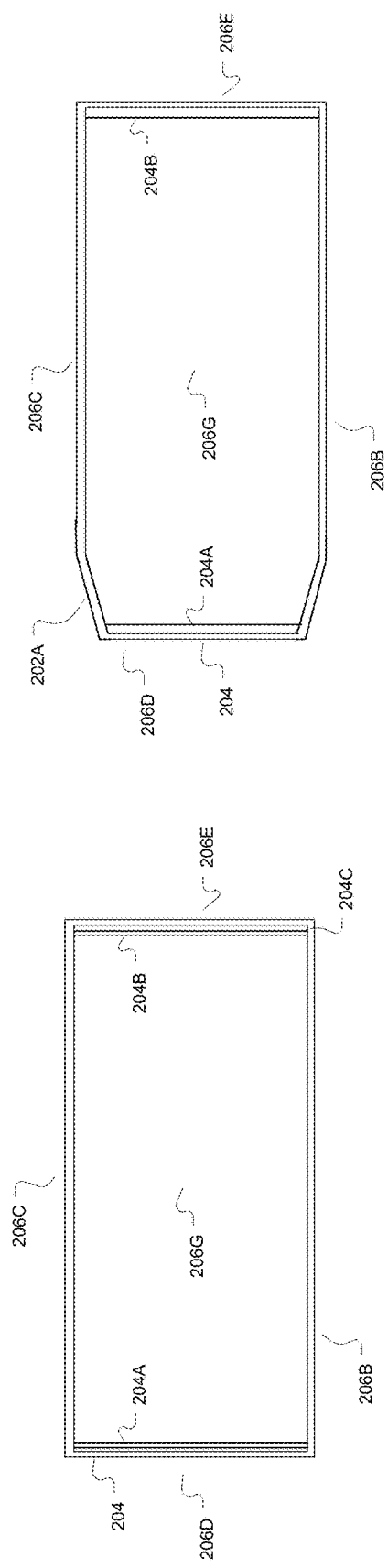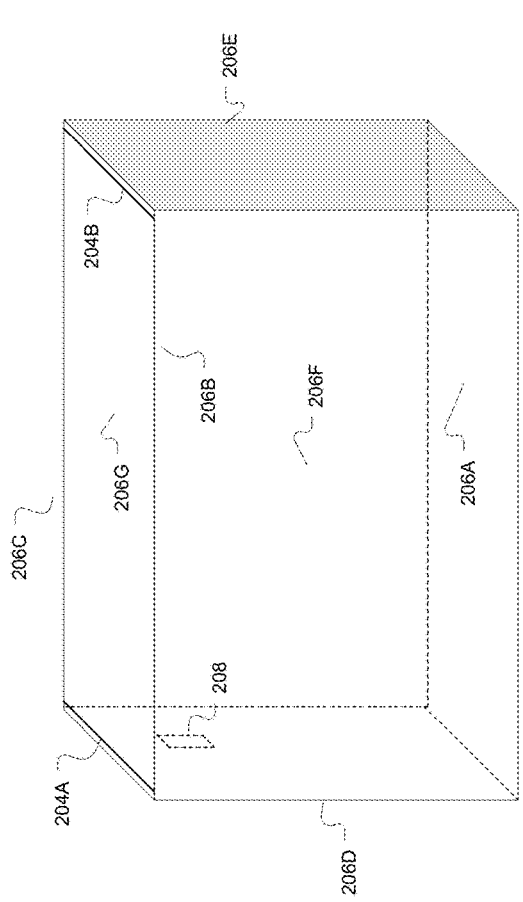

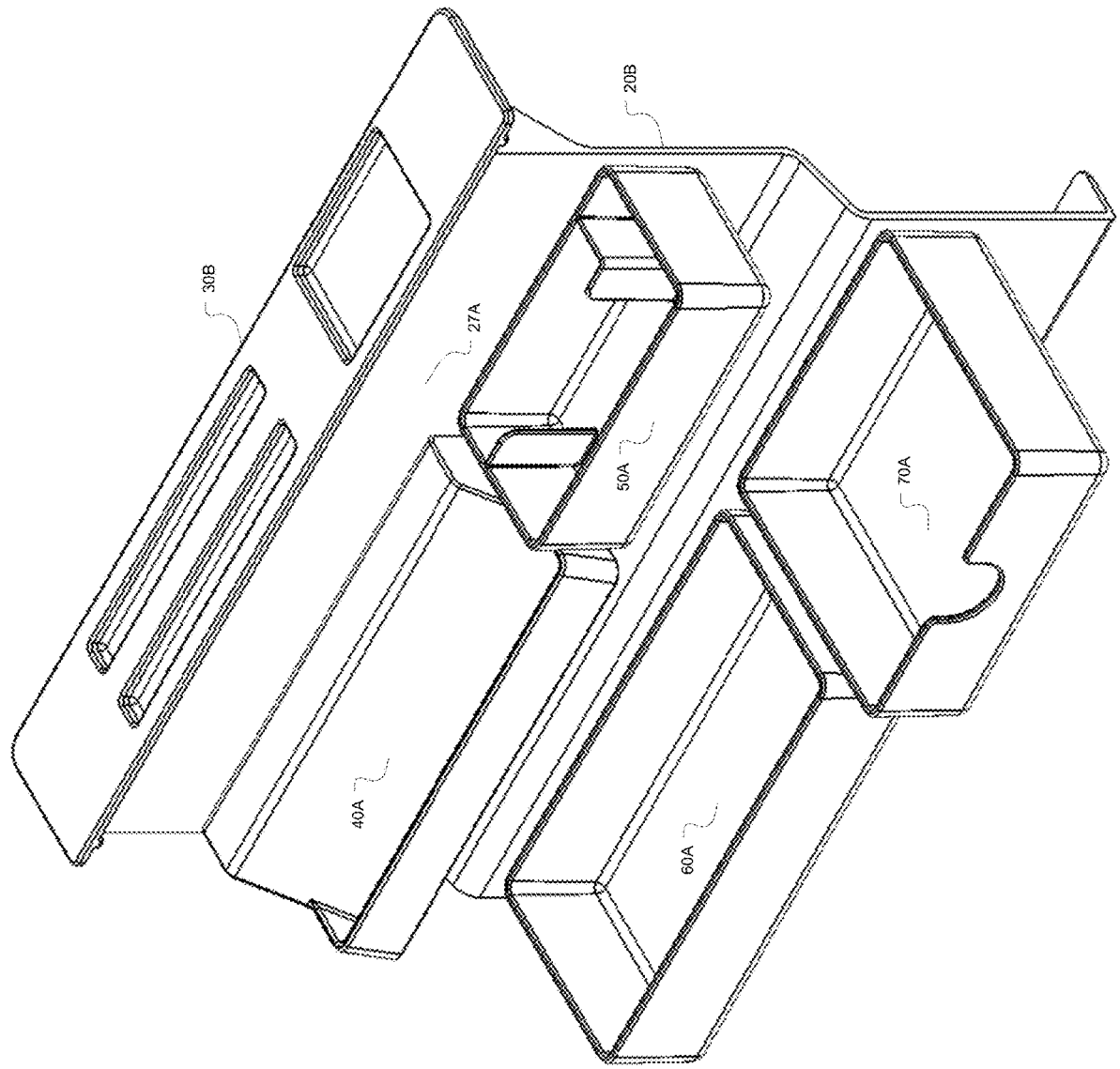

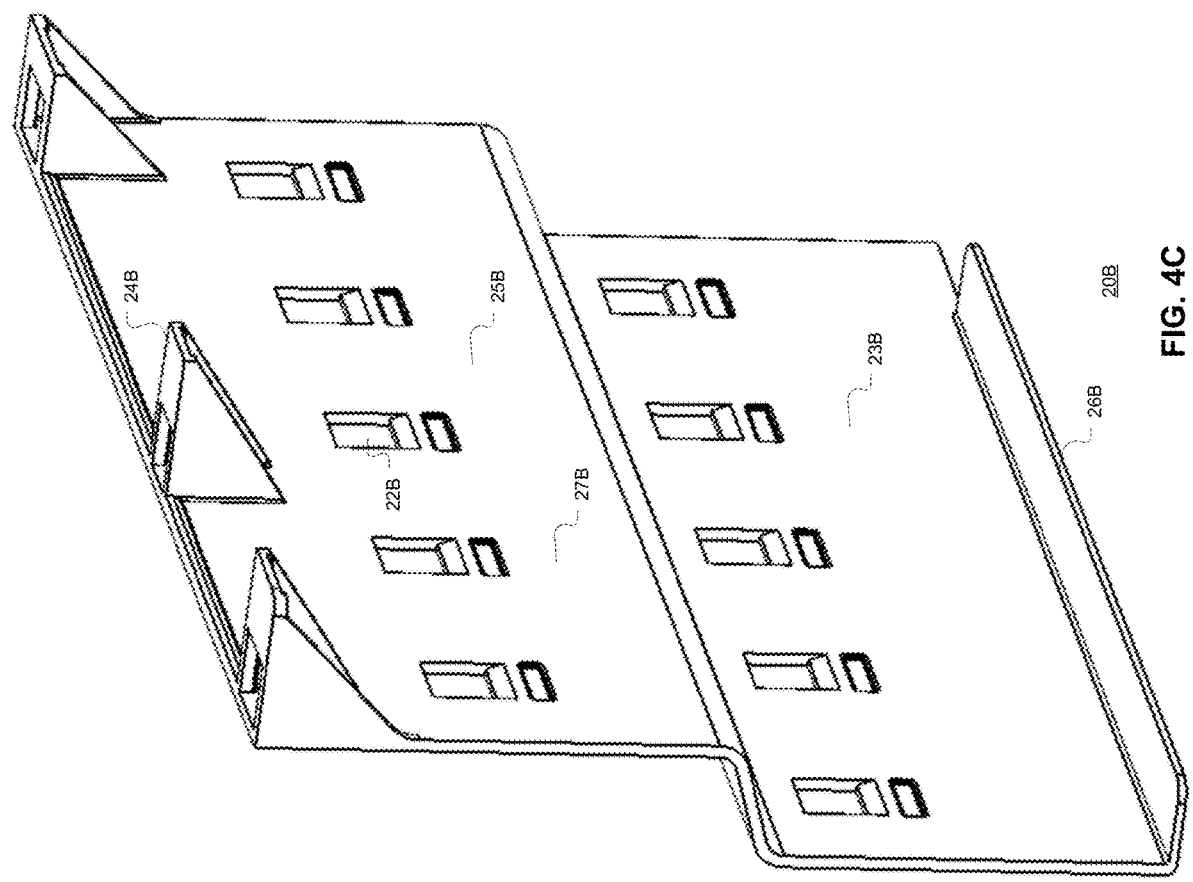

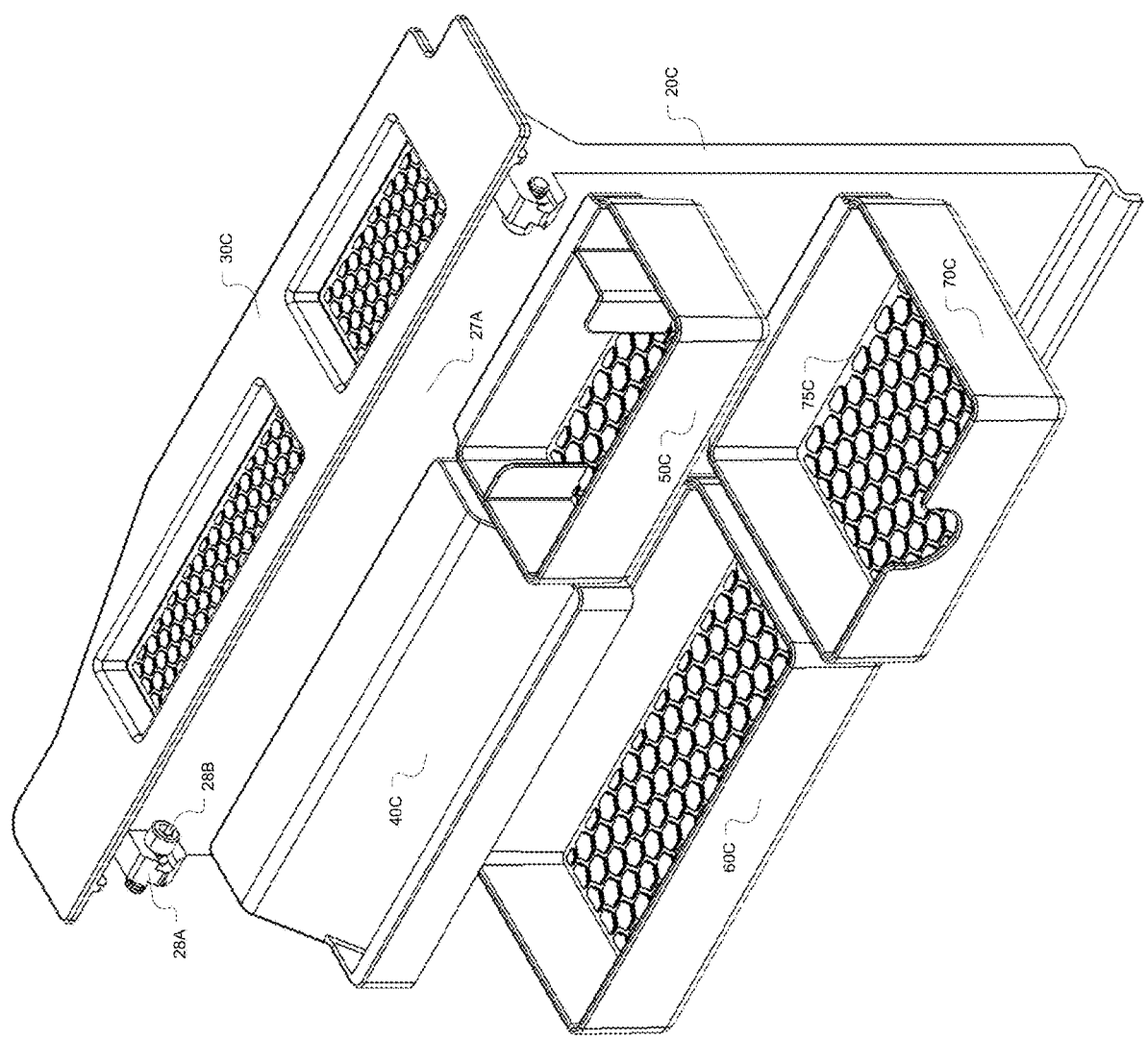

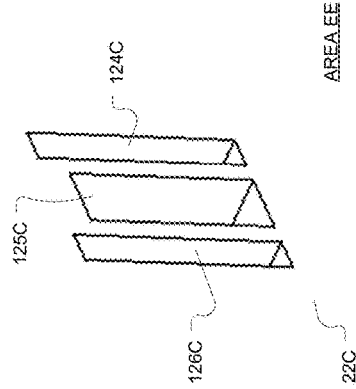
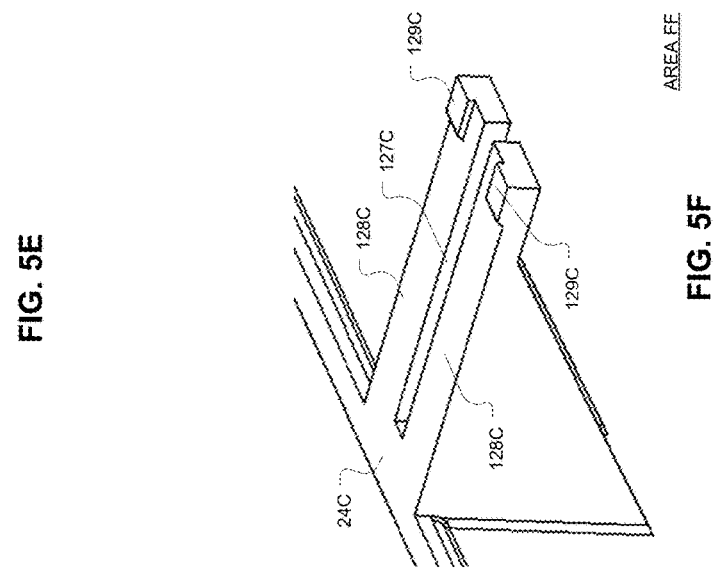
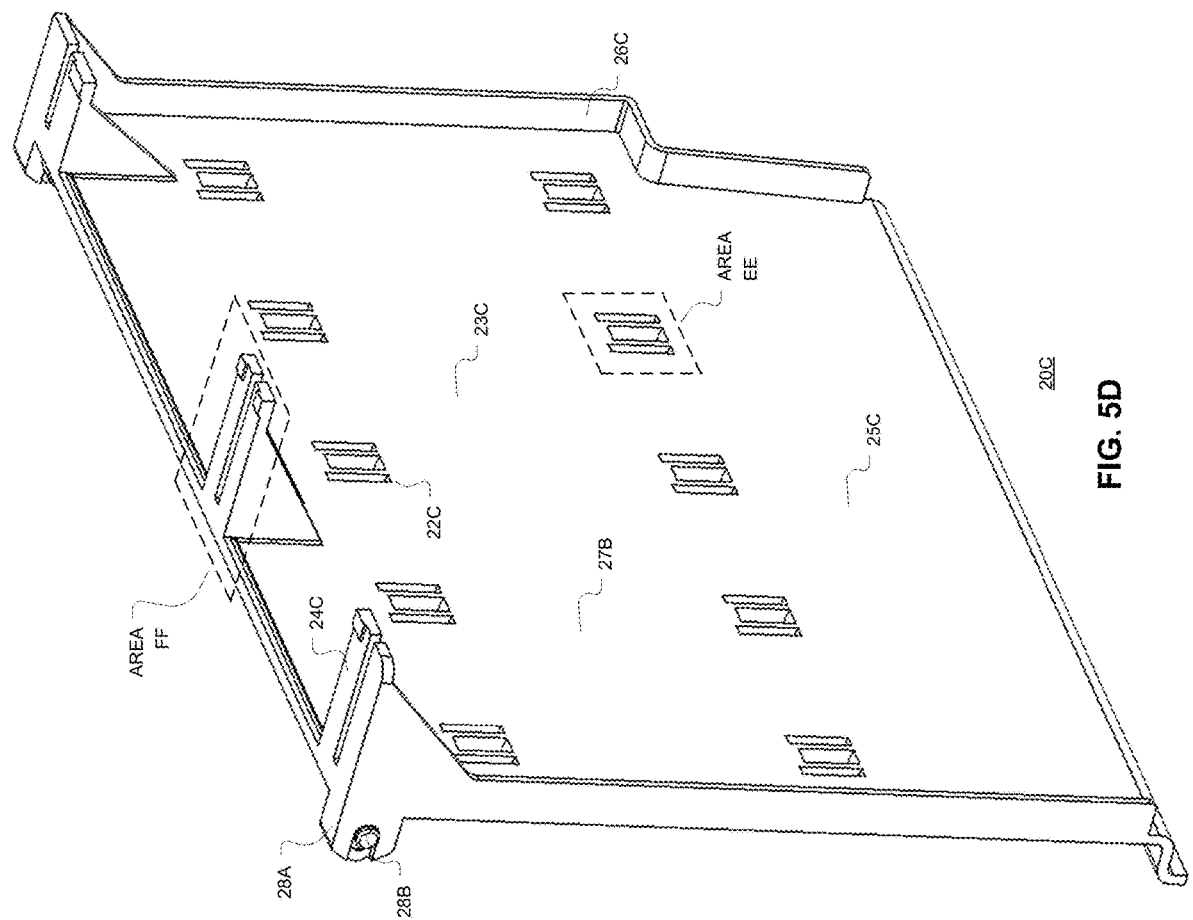

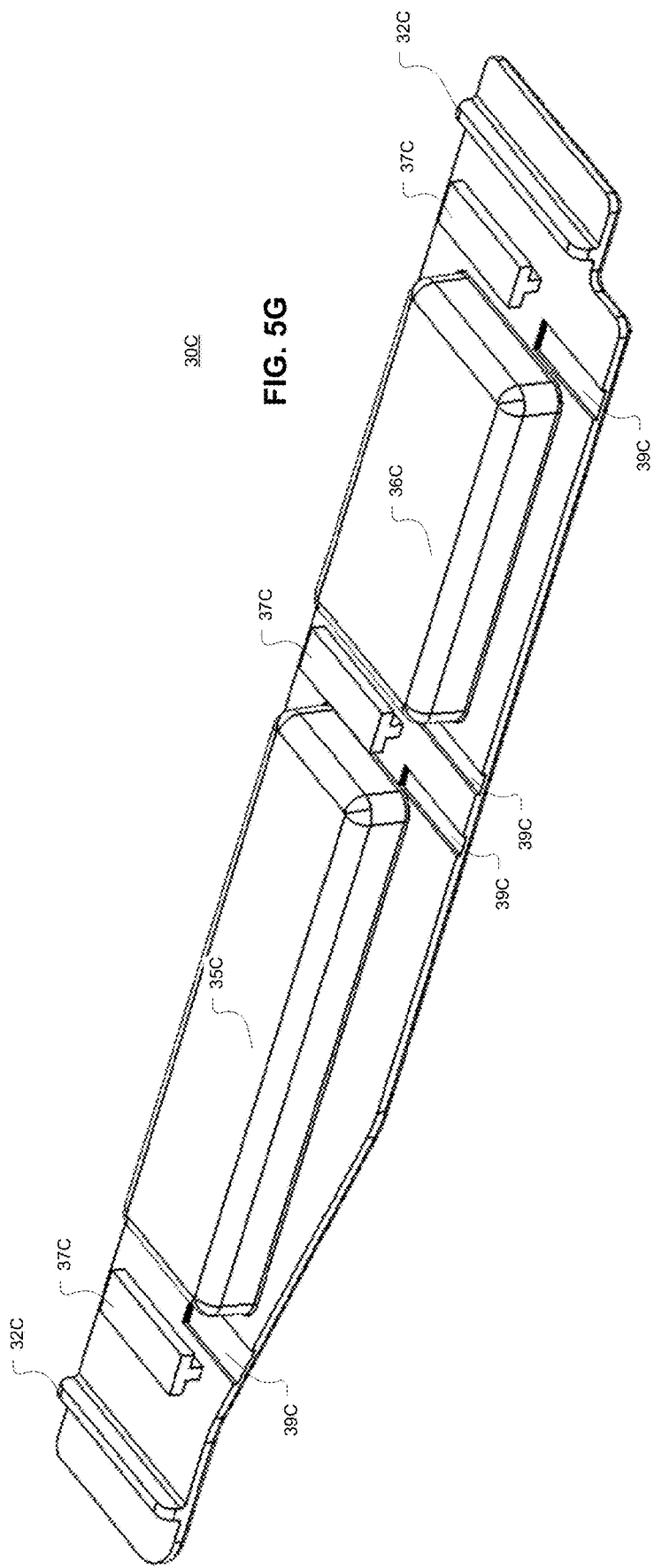

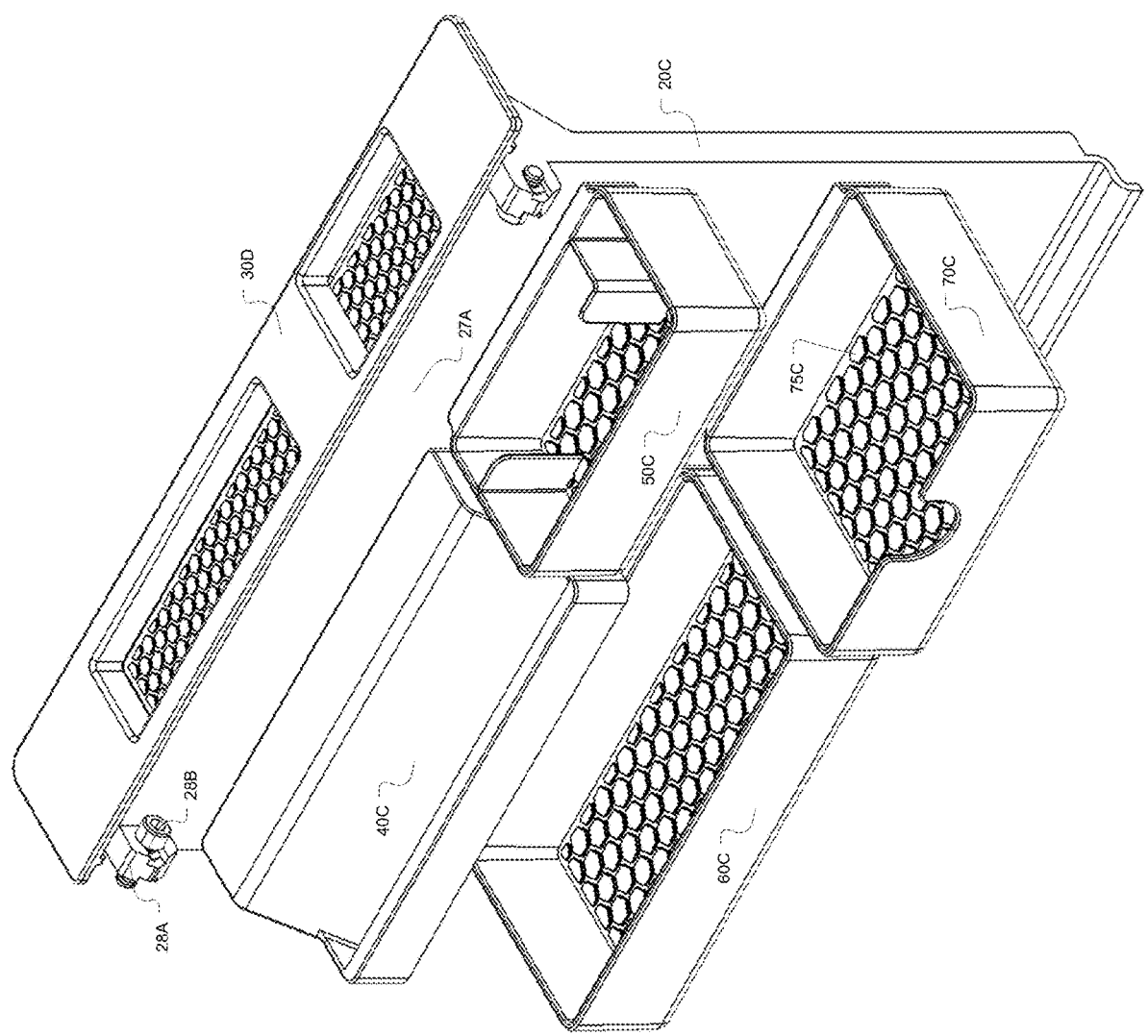

MODULAR OPEN SPACE ORGANIZER APPARATUS AND SYSTEM

BACKGROUND

Field of the Invention

The invention relates generally to open space storage area organizer apparatus and systems, in particular open space storage area designed for hanging folders.

Description of Related Art

It may be desirable to provide an organizer for open space storage area designed in part for hanging folders or having rails, the organizer having multiple functions and configurations. The present invention provides such an apparatus and system.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIG. 2A is a simplified isometric diagram of a modular open space organizer (MOSO) system in accordance with an embodiment of the present invention;

FIG. 2C is a simplified right view diagram of a modular open space organizer (MOSO) system in accordance with an embodiment of the present invention;

FIG. 2I is a simplified rear, isometric view diagram of a vertical wall module of the modular open space organizer (MOSO) system shown in FIGS. 2A-2G in accordance with an embodiment of the present invention;

FIG. 2J is a simplified view of an enlarged area AA shown in FIG. 2I in accordance with an embodiment of the present invention;

FIG. 2K is a simplified rear, isometric view diagram of a horizontal module of the modular open space organizer (MOSO) system shown in FIGS. 2A-2G in accordance with an embodiment of the present invention;

FIG. 2L is a simplified view of an enlarged area BB shown in FIG. 2K in accordance with an embodiment of the present invention;

FIG. 3A is a simplified top view diagram of an open storage area that may be employed in vehicle shown in FIG. 1A in accordance with an embodiment of the present invention;

FIG. 3B is a simplified isometric diagram of the open storage area shown in FIG. 3A in accordance with an embodiment of the present invention.

FIG. 3C is a simplified top view diagram of a non-rectangular open storage area that may be employed in vehicle shown in FIG. 1A in accordance with an embodiment of the present invention;

FIG. 4A is a simplified isometric diagram of another modular open space organizer (MOSO) system in accordance with an embodiment of the present invention;

FIG. 4C is a simplified rear, isometric view diagram of a vertical wall module of the modular open space organizer (MOSO) system shown in FIG. 4A in accordance with an embodiment of the present invention.

FIG. 5A is a simplified isometric diagram of a further modular open space organizer (MOSO) system in accordance with an embodiment of the present invention;

FIG. 5D is a simplified rear, isometric view diagram of a vertical wall module of the modular open space organizer (MOSO) system shown in FIG. 5A in accordance with an embodiment of the present invention;

FIG. 5E is a simplified view of an enlarged area EE shown in FIG. 5D in accordance with an embodiment of the present invention;

FIG. 5F is a simplified view of an enlarged area FF shown in FIG. 5D in accordance with an embodiment of the present invention;

FIG. 5G is a simplified bottom, isometric view diagram of a horizontal module of the modular open space organizer (MOSO) system shown in FIG. 5A in accordance with an embodiment of the present invention.

FIG. 6 is a simplified isometric diagram of a further modular open space organizer (MOSO) system in accordance with an embodiment of the present invention.

DETAILED DESCRIPTION

Throughout this description, embodiments and variations are described for the purpose of illustrating uses and implementations of the invention. The illustrative description should be understood as presenting examples of the invention, rather than as limiting the scope of the invention.

Open storage areas are provided in many products and locations including motor vehicles, boats, commercial and residential structures including console, drawers, cabinets, or other open storage areas. The open storage areas may include, nest, or be near power sources. The open storage areas may include rails to support hanging folders of one of many common sizes such as US and Metric size papers (legal, letter, A1-A5, and many others). The open storage area may be oriented in different configurations relative to Users that may access the area. The present invention provides embodiments of a modular open space organizer (MOSO) apparatus and system that may be configured to be employed in various open storage areas including areas that may include, nest, or be near power sources or include rails on its edges.

Figure 1A:
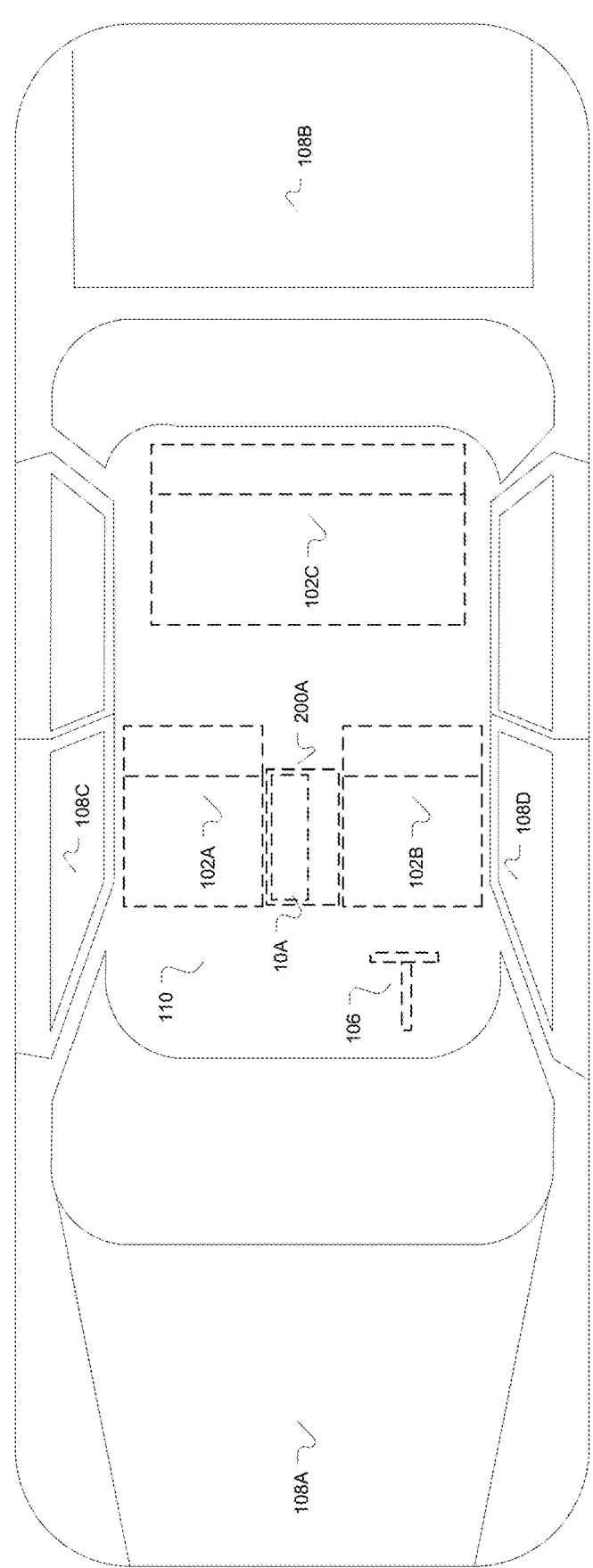
FIG. 1A is a simplified top diagram of a modular open space organizer (MOSO) system employed in a vehicle console with rails oriented from the vehicle front to back in accordance with an embodiment of the present invention.
Figure 1B:
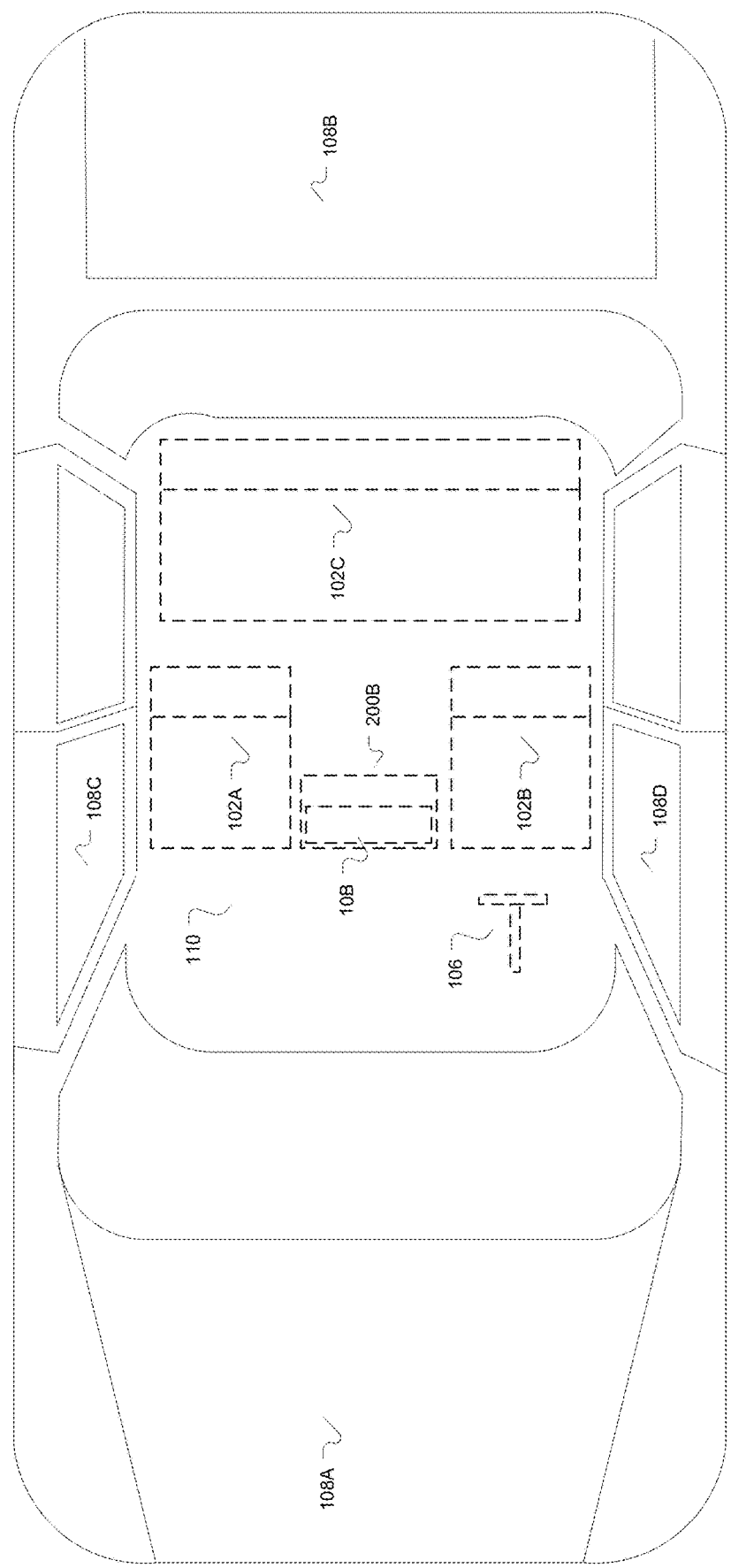
FIG. 1B is a simplified top diagram of a modular open space organizer (MOSO) system employed in a vehicle console with rails oriented from the vehicle driver side to passenger side in accordance with an embodiment of the present invention.

FIGS. 1A and 1B are simplified top diagrams of a modular open space organizer (MOSO) systems 10A, 10B employed in a vehicle 100A, 100B console 200A, 200B in accordance with embodiments of the present invention. As shown in FIGS. 1A and 1B, a vehicle 100A, 100B may include a front section 108A, a rear section 108B, left door(s) 108D, right door(s) 108C and a passenger compartment 110. The passenger compartment 110 may include rear seat(s) 102C, a right seat 102A, a left seat 102B, and a steering wheel 106 on the left or right side. The vehicle 100 passenger compartment 110 may also include an open storage area or console 200A, 200B. In an embodiment, the console 200A, 200B may be located between the front seats 102A, 102B. In an embodiment, the consoles 200A, 200B may be substantially rectangular in shape with one side longer than the other. In an embodiment, the console 200A may have its longer side framed by the passenger and driver seats 102A, 102B as shown in FIG. 1A. The console 200B may have its shorter side framed by the passenger and driver seats 102A, 102B as shown in FIG. 1B.

FIG. 3A is a simplified top view diagram of the open storage area 200A in accordance with an embodiment of the present invention and FIG. 3B is a simplified isometric diagram of the open storage area 200A shown in FIG. 1A in accordance with an embodiment of the present invention. As shown in FIGS. 3A and 3B, an open storage area 200A may have a central opening 206G extending to a bottom 206A. The opening 200A may include borders or a frame 204 with edges with a front side 206D, back side 206E, passenger or right side 206C and drivers or left side 206B in an embodiment. In an embodiment, the border or frame 204 may include a first edge with a rail 204A and a second rail 204B where the first rail 204A is adjacent the front side 206D and the second edge with a rail 204B is adjacent the back side 206E. As shown in FIG. 3B, an open storage area 200A, 200B may also include a power interface or conduit 208 on one or more walls within its cavity 206E.

Figure 3E:
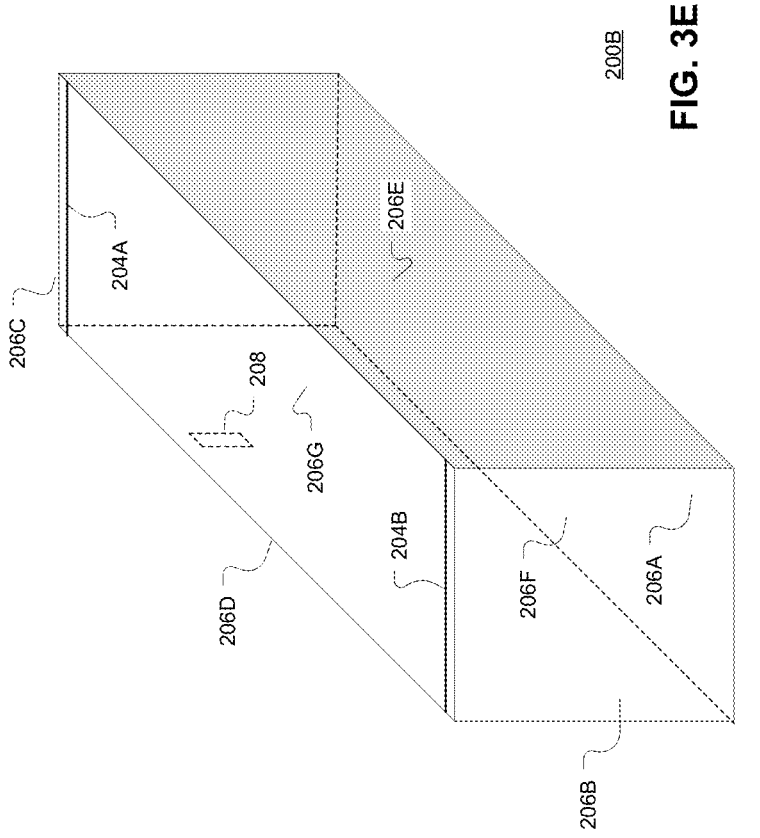
FIG. 3E is a simplified isometric diagram of the open storage area shown in FIG. 3D in accordance with an embodiment of the present invention.
Figure 3D:
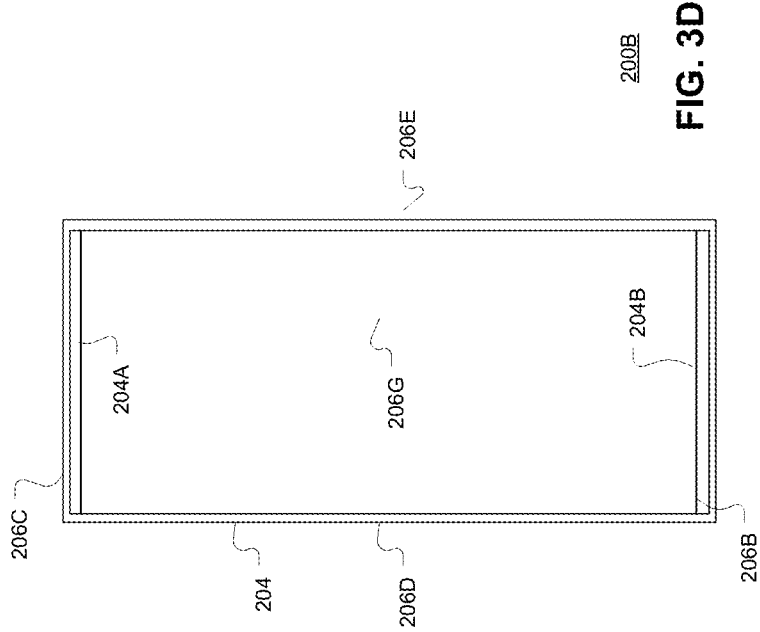
FIG. 3D is a simplified top view diagram of an open storage area that may be employed in vehicle shown in FIG. 1B in accordance with an embodiment of the present invention.

The open storage area 200A central opening 206G may have a known opening dimension(s) and shape. Its shape may vary by application or vehicle in an embodiment. In an embodiment as shown in FIG. 3C, an open storage area 200C similar to area 200A may include wall insets 202A on the left and right sides 206B, 206C at the area 200C front side 206D. Similarly, an open storage area's 200A, 200B volume and depth shape and dimensions may be known. In an embodiment shown in FIGS. 3D and 3E, an open storage area 200B may oriented with its short sides on the passenger's side 206C and driver's side 206B as shown in FIG. 1B. In this embodiment the first edge with a rail 204A may be adjacent the passenger's side 206C and the second edge with a rail 204B may be adjacent the driver's side 206B.

In an embodiment, the rails 204A, 204B shown in open storage areas 200A, 200B, and 200C may be separated by a fixed distance and have a groove 204C that enable a complementary tab to operatively engage. In an embodiment, the fixed distance may be based on a standardized paper folder size including legal, letter, A1, A2, A3, A4, A5, and others. In such an embodiment, the depth of an open storage area 200A, 200B, and 200C may also be at least the width the respective standardized paper size. In an embodiment, the distance between rails 204A, 204B may be greater than or about 11 inches and the open storage areas 200A, 200B, and 200C depth may be greater than or about 8.5 inches so a US standard letter (8.5 inches by 11 inches) hanging folder may be hung within the open storage areas 200A, 200B, and 200C via the rails 204A, 204B grooves 204C.

A MOSO system 10A, 10B according to various embodiments may be sized and shaped to fit within all or part of a segment of an open storage area 200A, 200B including engaging the first rail 204A and the second rail 204B in an embodiment. FIG. 2A is a simplified isometric diagram of a first modular open space organizer (MOSO) system 10A in accordance with an embodiment of the present invention. As shown in FIG. 2A, the MOSO system 10A may include a vertical module coupling component (VMCC) 20A, a horizontal rail engaging component (HREC) 30A, and a plurality of storage modules 40A, 50A, 60A, and 70A coupled to the VMCC's first or left wall 27A, the second or right wall 27B, or both walls 27A, 27B in an embodiment. Only attachments on the left wall 27A are shown for simplicity. As shown in FIG. 2A, the HREC 30A may be coupled to the top section of the VMCC 20A. In an embodiment, the storage modules 40A, 50A, 60A, and 70A may be coupled to a first or left side 27A of the VMCC 20A. In an embodiment, the VMCC 20A and HREC 30A may be separate, couplable component or a single component.

In an embodiment, the storage modules 40A, 50A, 60A, and 70A may have different features or attributes and may be couplable at different locations on the VMCC 20A first or left side wall 27A via a User. The storage modules 40A, 50A, 60A, and 70A may include a phone tray storage module 40A, an accessory tray storage module 50A, a rectangular tray storage module 60A, and a square tray storage module 70A. As shown in FIG. 2A, the various storage modules 40A, 50A, 60A, and 70A may have different length (across the VMCC 20A left side wall 27A), width (extension from the VMCC 20A left side wall 27A), shapes, and elements. As also shown in FIG. 2A, the HREC 30A may have storage areas 35A, 36A. In an embodiment, storage area 35A may be include several long insets that may be sized to hold writing instruments. The storage area 36A may be a rectangular inset sized to hold coins, keys, key fobs, and other similarly sized items as a function of the rectangular inset size and depth.

Figure 2B:
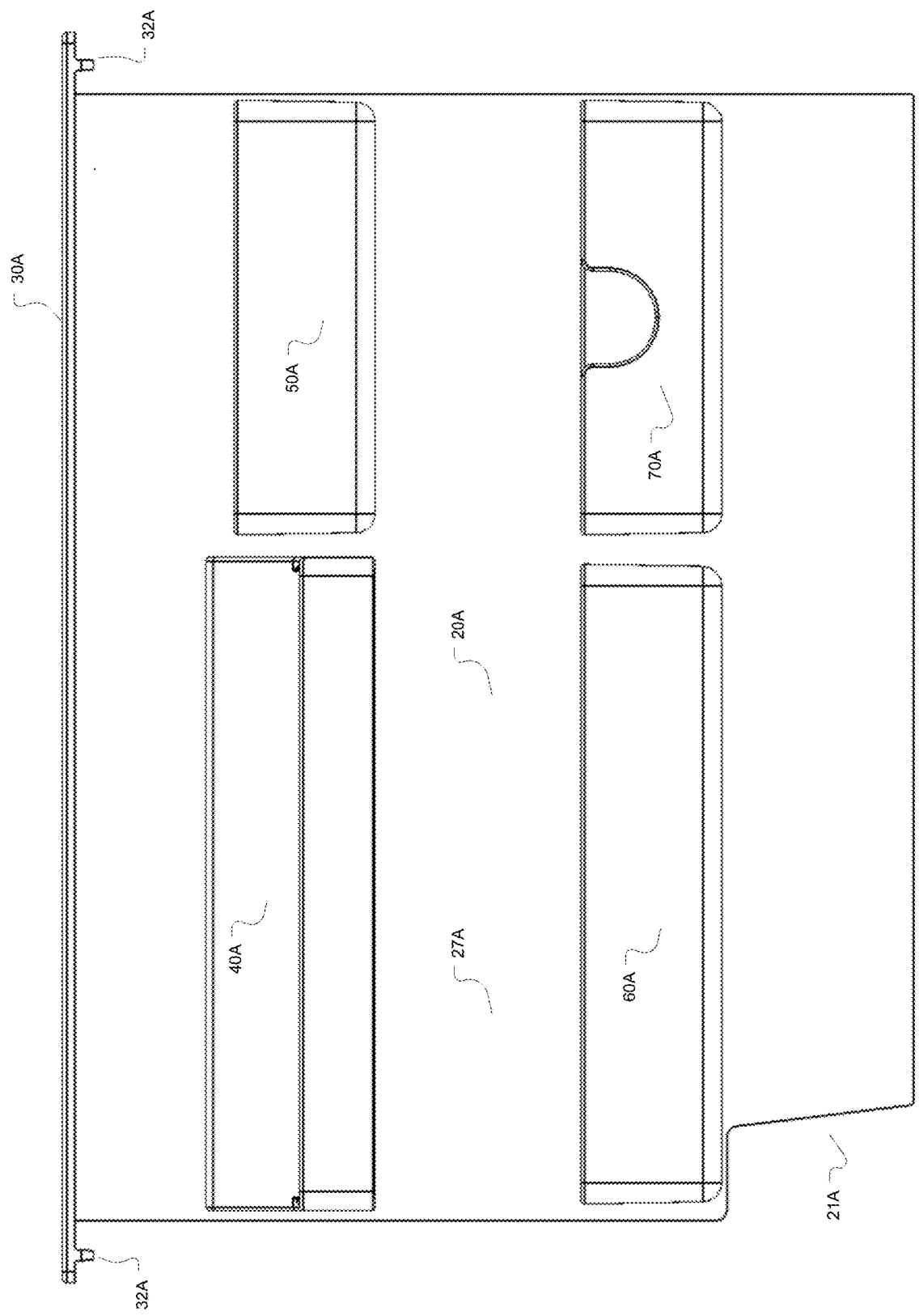
FIG. 2B is a simplified left side view diagram of a modular open space organizer (MOSO) system in accordance with an embodiment of the present invention.

FIG. 2B is a simplified left side view diagram of the modular open space organizer (MOSO) system 10A in accordance with an embodiment of the present invention. As shown in FIG. 2B, the storage modules 40A, 50A, 60A, and 70A may spaced apart on the VMCC 20A first wall 27A. In an embodiment, the base of modules in a row may be substantially at the same height of the first wall 27A. In particular, storage module 40A and 50A may be located on a first, upper row of the first wall 27A and the modules 60A and 70A may be located on a second, lower row of the first wall 27A where the wall 27A is substantially planar along the rows. The storage modules 40A, 50A, 60A, and 70A may located on any row in an embodiment. For example, storage module 60A could be located on the upper or lower row alone or with storage module 50A or 70A. Similarly, the storage module 40A could be located on the lower or upper row alone or with storage module 50A or 70A. A User may employ all the storage modules 40A, 50A, 60A, and 70A, or one to four of the modules in different configurations on the first wall 27A. In an embodiment, other modules could be employed on the first wall 27A.

As show in FIG. 2B, the VMCC 30A may include offsets or insets 21A in shape to accommodate the interior shape of an open storage area 200A, 200B, 200C cavity 206F. As also show in FIG. 2B, the HREC 30A may include rail extensions or tabs 32A, 32B on opposite ends. The rail extensions 32A. 32B horizontal separation and vertical length may be selected or configured to mate with the rails 204A, 204B grooves 204C. FIG. 2C is a simplified right view diagram of a modular open space organizer (MOSO) system 10A in accordance with an embodiment of the present invention.

As shown in FIG. 2C, the VMCC 30A may include several arm openings 22A with arm tab complementary recesses 124 configured and sized to enable a module's 40A, 50A, 60A, and 70A arms 42A, 52A, 62A, and 72A to extend into and engage the openings 22A and recesses 124. In an embodiment, the VMCC 30A may include ten (10) openings 22A in two rows of five. As also shown in FIG. 2C, the modules 50A, 70A may include two sets of arms 52A, 72A that may securely couple to the VMCC 30A via openings 22A where the modules 50A, 70A span two openings 22A.

In an embodiment, the storage modules 40A, 60A may also include two sets of arms 42A, 62A that may securely couple to the VMCC 30A via two sets of openings 22A where the storage modules 40A, 60A span three openings 22A. In an embodiment, the storage modules 40A, 60A may include two sets of arms 42A, 62A may include a gap where another arm may be added to engage a middle opening 22A. In an embodiment, the storage modules 40A, 60A may also include three sets of arms 42A, 62A that may securely couple to the VMCC 30A via three set of openings 22A.

Figure 2E:
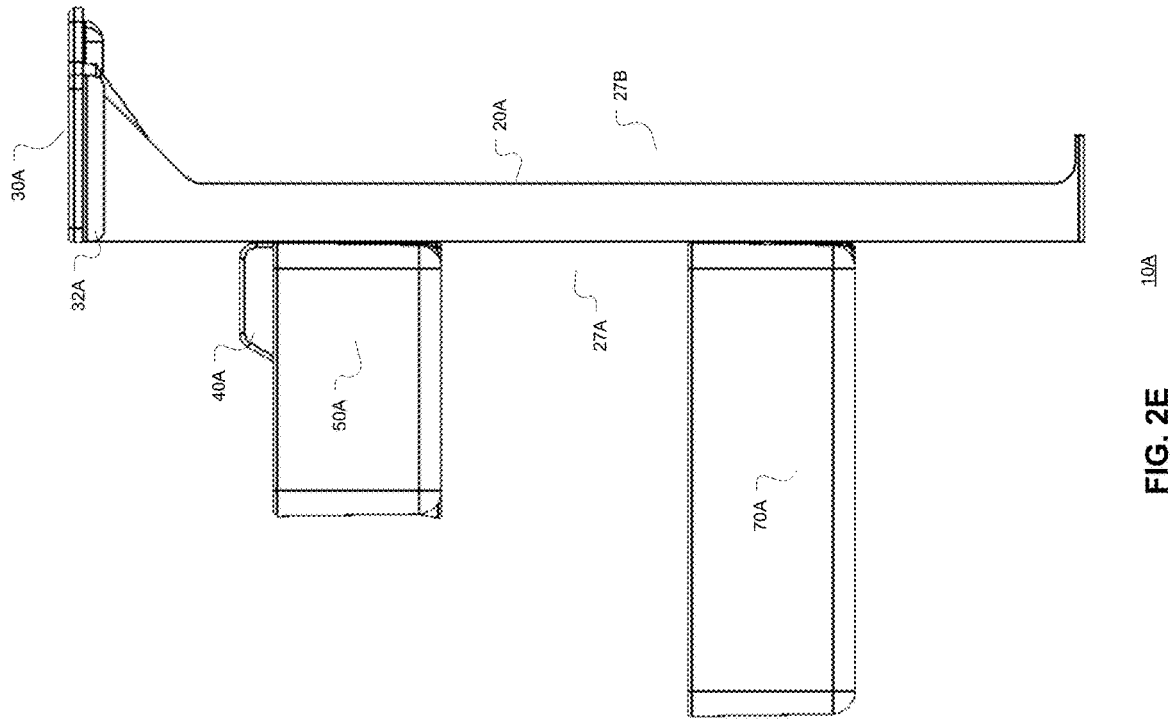
FIG. 2E is a simplified back view diagram of a modular open space organizer (MOSO) system in accordance with an embodiment of the present invention.
Figure 2D:
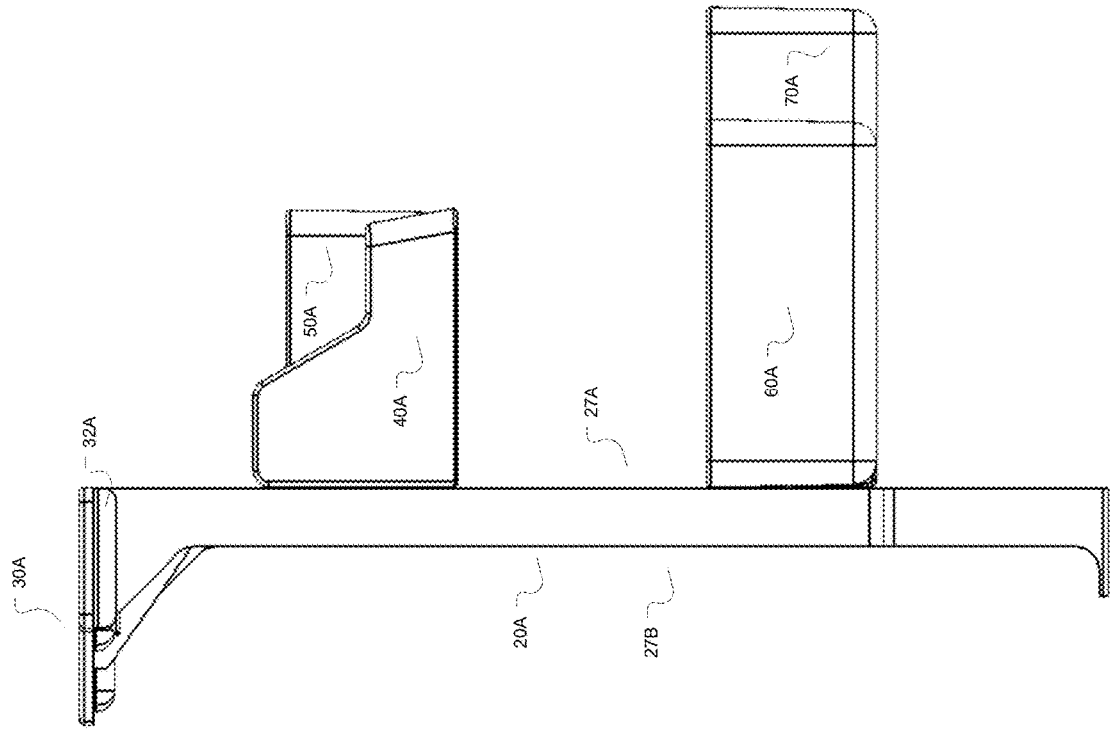
FIG. 2D is a simplified front view diagram of a modular open space organizer (MOSO) system in accordance with an embodiment of the present invention.
Figure 2F:
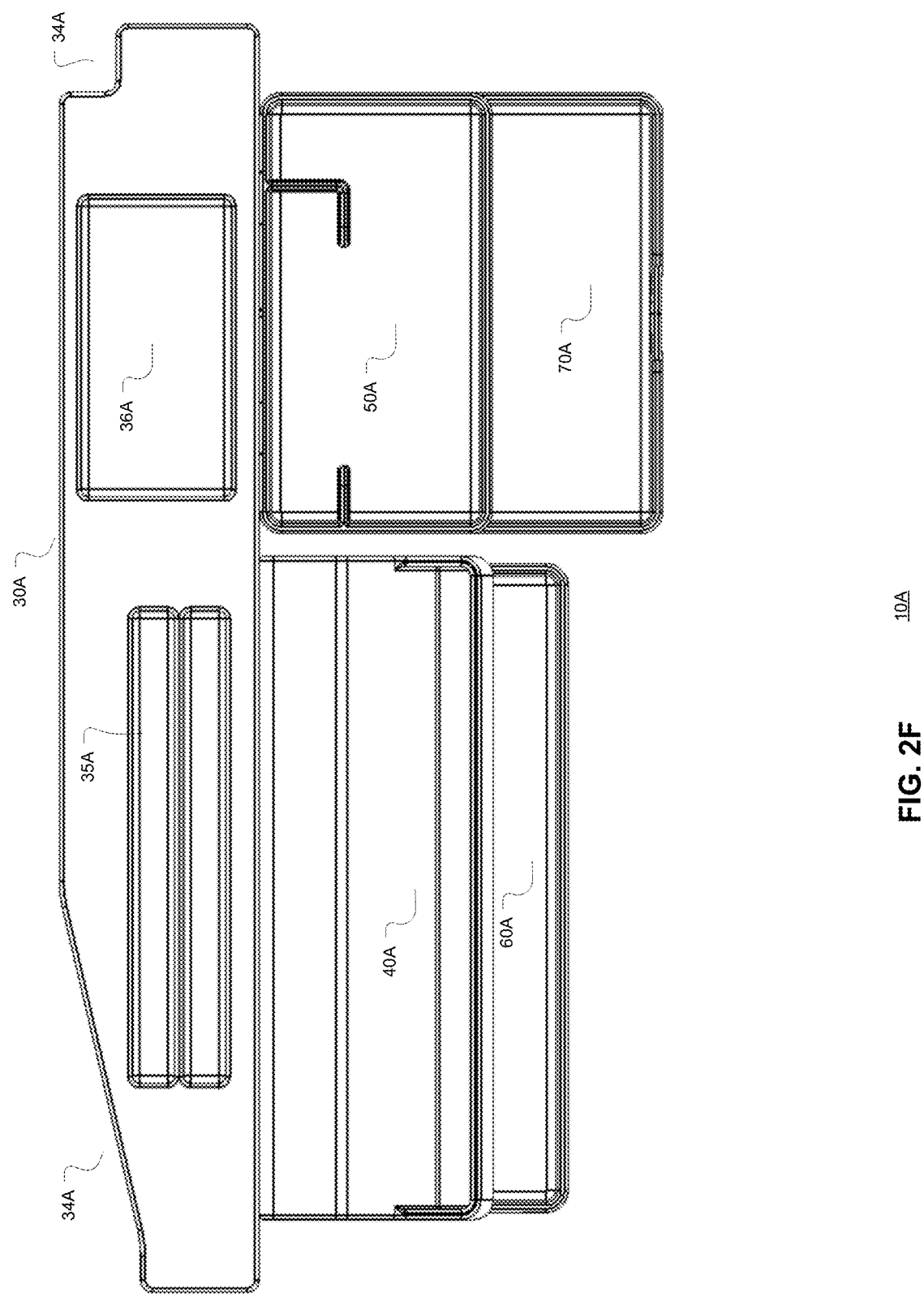
FIG. 2F is a simplified top view diagram of a modular open space organizer (MOSO) system in accordance with an embodiment of the present invention.

FIG. 2D is a simplified front view diagram of a modular open space organizer (MOSO) system 10A in accordance with an embodiment of the present invention. FIG. 2E is a simplified back view diagram of a modular open space organizer (MOSO) system 10A in accordance with an embodiment of the present invention. FIG. 2F is a simplified top view diagram of a modular open space organizer (MOSO) system 10A in accordance with an embodiment of the present invention As shown in FIGS. 2D, 2E, and 2F, the storage module 70A may extend the furthest from the VMCC 20A inner or left wall 27A. The storage module 60A may extend the further from the VMCC 20A inner or left wall 27A than storage modules 40A, and 50A. Storage modules 40A and 50A may extend similar distances from the inner or left wall 27A in an embodiment.

Figure 2G:
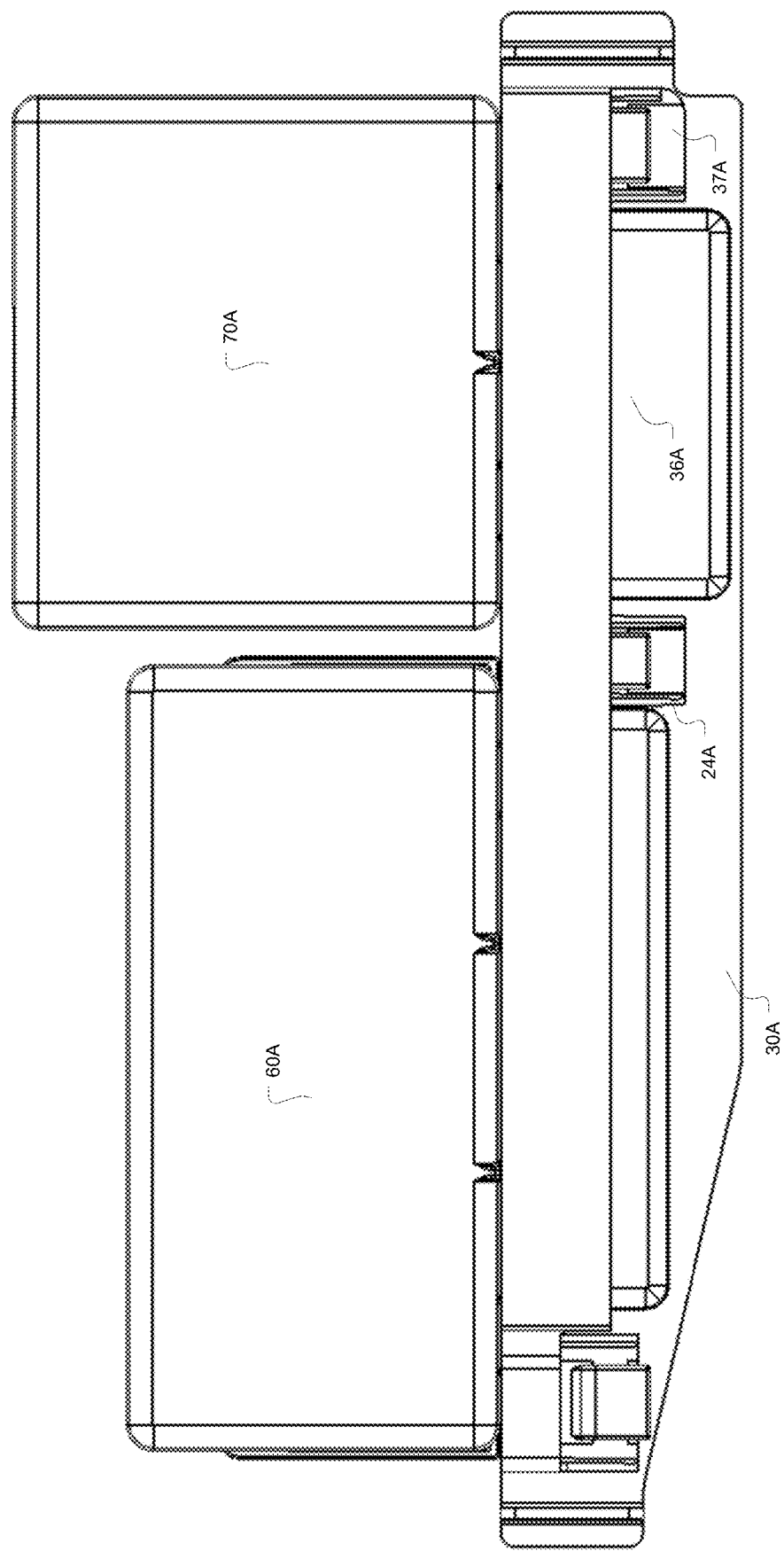
FIG. 2G is a simplified bottom view diagram of a modular open space organizer (MOSO) system in accordance with an embodiment of the present invention.

As shown in FIG. 2F, the HREC 30A may include several insets 34A in its perimeter to conform the inner cavity 206F of an open storage area 200A, 200B, 200C such as open storage area 200C wall insets 202A. The HREC 30A also includes the long insets 35A and rectangular inset 36A. FIG. 2G is a simplified bottom view diagram of a modular open space organizer (MOSO) system 10A in accordance with an embodiment of the present invention. In an embodiment, the HREC 30A may include three arms that may be securely coupled to the VMCC 20A via three horizontal extension interfaces 24A as shown in FIG. 2G. In an embodiment, the HREC 30A may be securely and removably coupled to the VMCC 20A to enable the quick configuration of a MOSO system 10A, 10B for different open storage areas 200A, 200B, 200C.

Figure 2H:
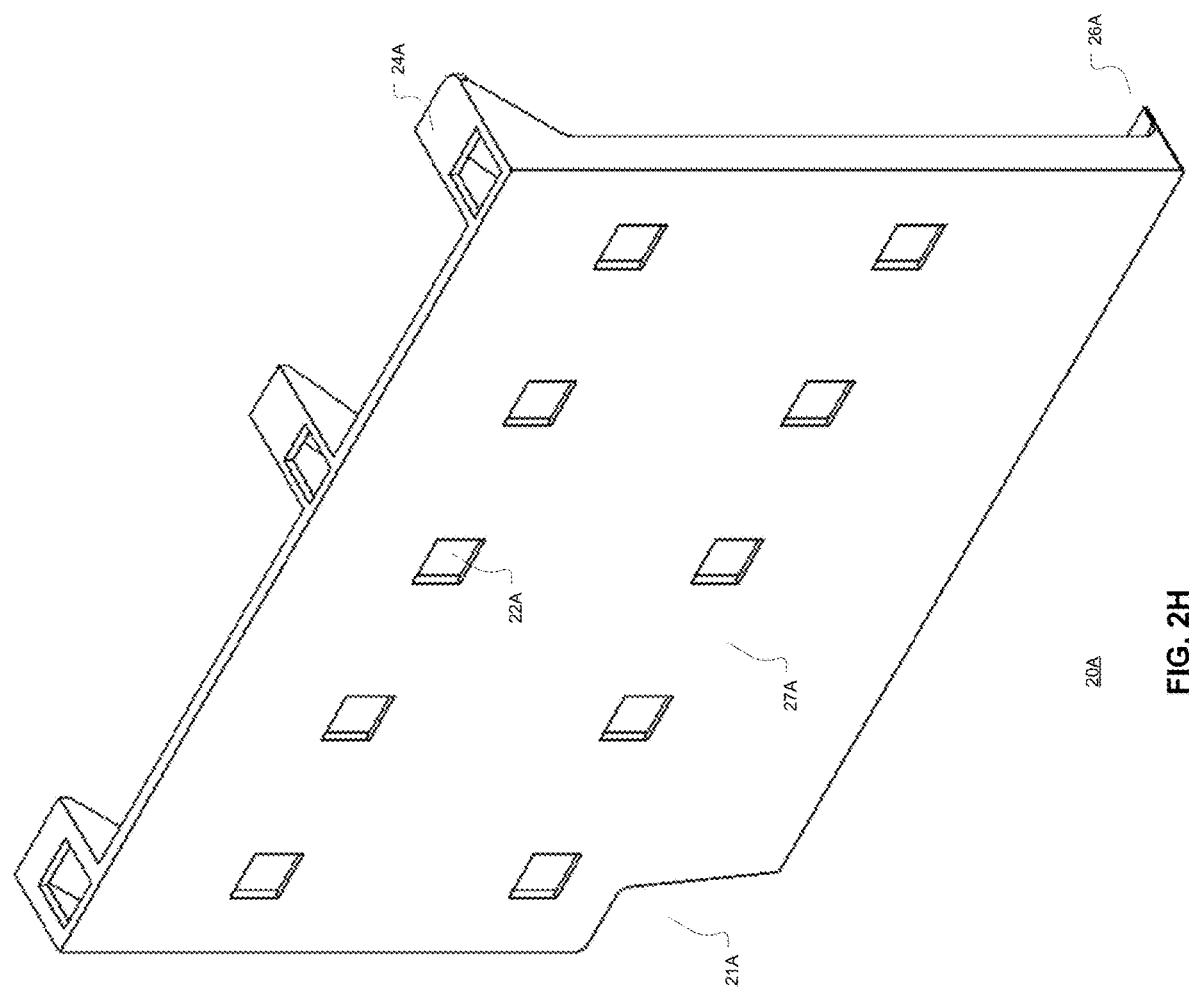
FIG. 2H is a simplified front, isometric view diagram of a vertical wall module of the modular open space organizer (MOSO) system shown in FIGS. 2A-2G in accordance with an embodiment of the present invention.

In an embodiment, an open storage area 200A-C may be part of a vehicle 100A, 100B where each vehicle 100A, 100B may have different open storage area 200A-C shapes. Further the storage modules 40A-70A may also be used in different open storage areas 200A-C. The MOSO system 10A may be easily adapted for different open storage areas 200A-C, reducing production and inventory costs. FIG. 2H is a simplified front, isometric view diagram of a VMCC 20A of the modular open space organizer (MOSO) system 10A shown in FIGS. 2A-2G in accordance with an embodiment of the present invention. FIG. 2I is a simplified rear, isometric view diagram of a VMCC 20A of the modular open space organizer (MOSO) system shown in FIGS. 2A-2G in accordance with an embodiment of the present invention.

As shown in FIGS. 2H and 2I and discussed above, a VMCC 20A may include a plurality of storage module 40A-70A complementary arm openings 22A. FIG. 2J is a simplified view of an enlarged area AA of a right wall complementary arm opening 22A shown in FIG. 2I in accordance with an embodiment of the present invention. As shown in FIG. 2I, a complementary arm opening 22A may include an arm opening 122A, arm tab ramp 123A, and arm tab recess 124A. The arm opening 122A may be sized to enable an arm 42A-72A of a storage module 40A-70A to pass therethrough (when rotated at an angle). The arm tab ramp 123A may be declined to pass or deflect a tab of an arm 42A-72A of a storage module 40A-70A through the opening 122A to nest into the recess 124A. The recess 124A may be sized to engage a tab of an arm 42A-72A of a storage module 40A-70A securely. To remove a storage module 40A-70A, a User may need to deflect each tab of the arms 42A-72A of a storage module 40A-70A to extend beyond the recesses 124A of each opening 22A engaged by an arm 42A-72A of a storage module 40A-70A.

As also shown in FIGS. 2H and 2I, the VMCC 20A may include a horizontal extension or edge 26A on its right wall 27A. The extension 26A may be sized and shaped to engage segments of a open storage space 200A, 200B, 200C cavity 206F. FIG. 2K is a simplified rear, isometric view diagram of a HREC 30A of the modular open space organizer (MOSO) system 10A shown in FIGS. 2A-2G in accordance with an embodiment of the present invention. As shown in FIG. 2K, a HREC 30A may include several (two in an embodiment) rail groove engaging extensions or tabs 32A and several (three in an embodiment) VMCC engaging arms 37A, and insets 35A and 36A. FIG. 2L is a simplified view of an enlarged area BB of an engaging arm 37A shown in FIG. 2K in accordance with an embodiment of the present invention. The engaging arms 37A may be similar in function to the arms 42A-72A of a storage module 40A-70A and include a tab 38A. The VMCC extension arm interface 24A may include an opening similar to 22A and further include a ramp and recess to engage the tab 38A of an engaging arm 37A.

In an embodiment, the VMCC 20A may have a width of about 200 to 400 mm and about 302 mm in an embodiment. The VMCC 20A may have a height of about 150 to 300 mm and about 237 mm in an embodiment. The openings 22A may be about 10 to 30 mm in height and about 16 mm and about 10 to 30 mm in width and about 17 mm in an embodiment. The upper row of openings 22A may be 20 to 60 mm from the VMCC 20A top and about 46.50 mm in an embodiment. The lower row of openings 22A may be 120 to 160 mm from the VMCC 20A top and about 139.50 mm in an embodiment. As shown in FIGS. 2H and 2I, the VMCC 20A may include three extension arm interfaces 24A.

The front interface 24A may have a width from about 15 to 40 mm and about 30 mm in an embodiment and extend from about 15 to 40 mm and about 28 mm in an embodiment. The middle interface 24A may have a width from about 10 to 30 mm and about 20 mm in an embodiment and extend from about 15 to 50 mm and about 38 mm in an embodiment. The middle interface 24A may be about 100 to 150 mm and about 137 mm from the front interface 24A. The back interface 24A may have a width from about 10 to 40 mm and about 25 mm in an embodiment and extend from about 15 to 50 mm and about 38 mm in an embodiment. In an embodiment, the VMCC 20A lower inset 21A may have a width from about 10 to 40 mm and about 25 mm in an embodiment.

In an embodiment the HREC 30A rail groove engaging extensions 32A shown in FIG. 2K may be separated by about 200 to 400 mm and about 320.50 mm in an embodiment. The HREC 30A may have an overall length of about 250 to 450 mm and about 352 mm in an embodiment. The HREC 30A may have an overall width of about 40 to 90 mm and about 70.5 mm in an embodiment. The HREC 30A long insets 35A may have an overall length of about 80 to 150 mm and about 125 mm in an embodiment and may have an overall width of about 5 to 20 mm and about 11.5 mm in an embodiment. The HREC 30A rectangular inset 36A may have an overall length of about 50 to 120 mm and about 79 mm in an embodiment and may have an overall width of about 20 to 60 mm and about 40 mm in an embodiment.

Figure 2M:
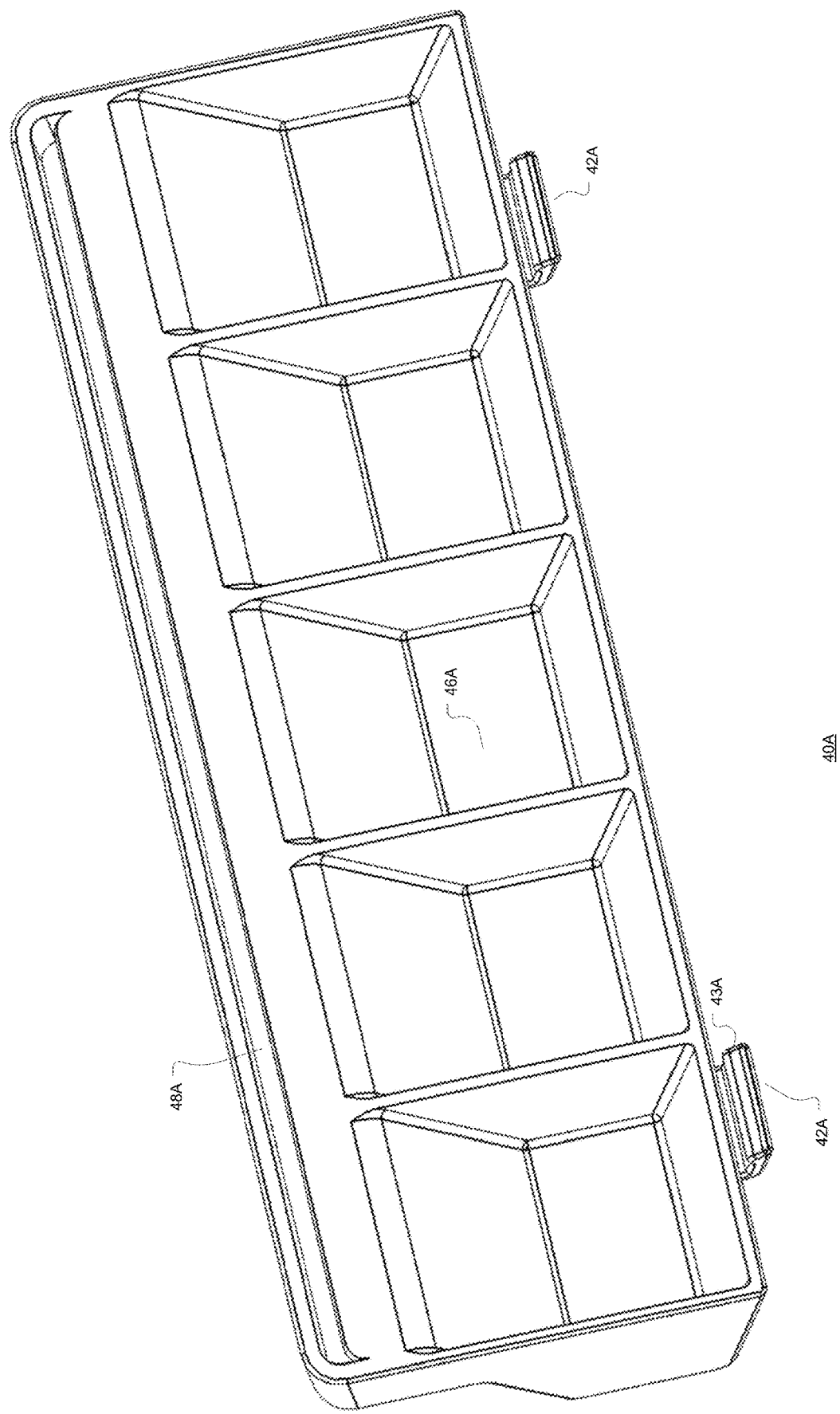
FIG. 2M is a simplified rear, isometric view diagram of a tray with slanted wall module of the modular open space organizer (MOSO) system shown in FIGS. 2A-2G in accordance with an embodiment of the present invention.

FIG. 2M is a simplified rear, isometric view diagram of a phone tray storage module 40A of the modular open space organizer (MOSO) system shown in FIGS. 2A-2G in accordance with an embodiment of the present invention. As shown in FIG. 2M, the arms 42A may include a tab 43A to engage the arm opening 22A ramp 123 and nest in the recess 124 to be securely engaged to the VMCC 30A. As also shown in FIG. 2M, the storage module 40A may include one or more sections 46A to increase the strength of the storage module 40A slanted wall 44A. The storage module 40A may also include a slit 48A along its front edge. In an embodiment the storage module 40A may have an overall length of about 120 to 250 mm and about 175 mm in an embodiment. The storage module 40A may have an overall width of about 30 to 80 mm and about 58 mm in an embodiment. The storage module 40A may have an overall height of about 25 to 70 mm and about 45 mm in an embodiment.

Figure 2N:
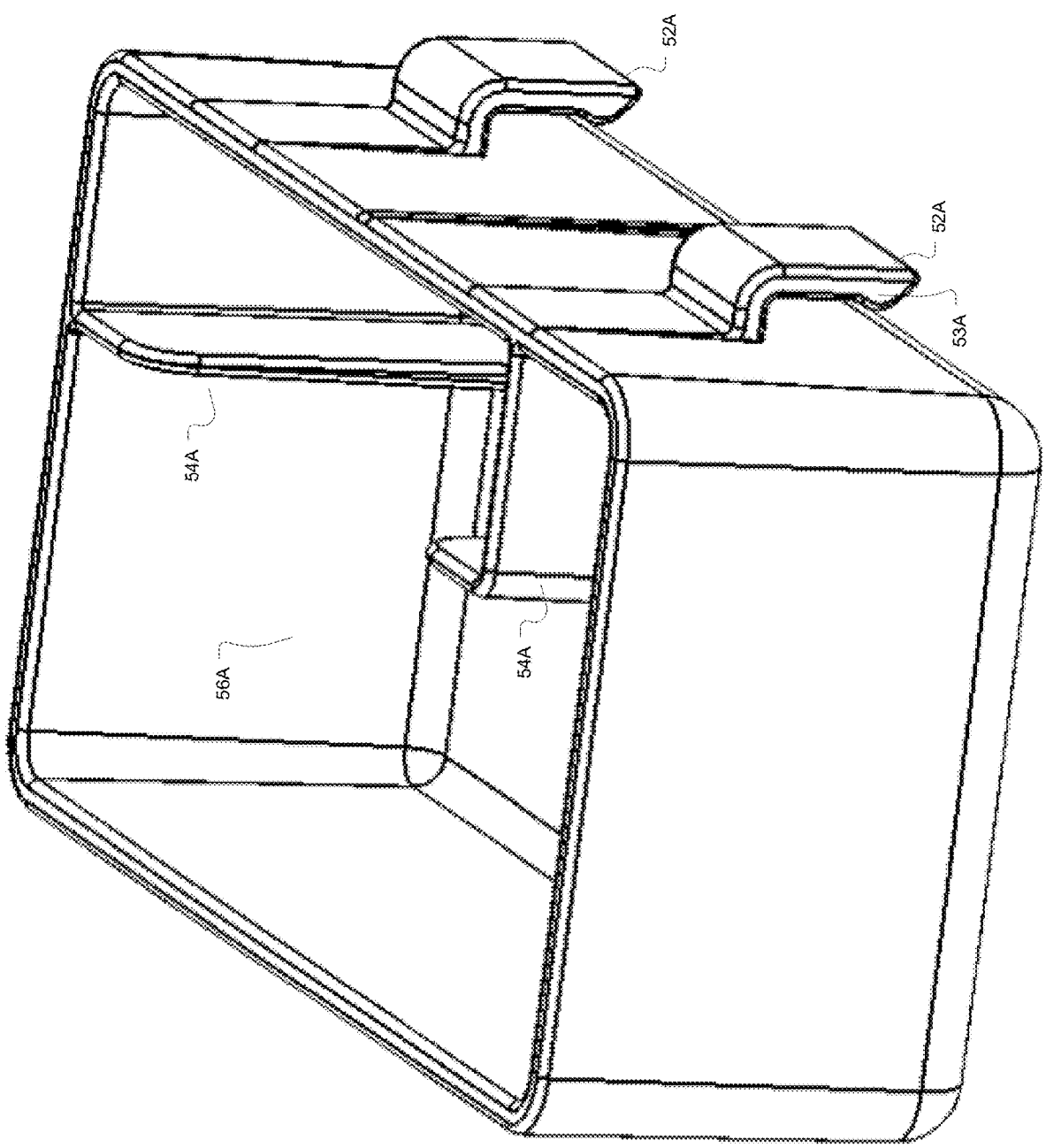
FIG. 2N is a simplified rear, isometric view diagram of an accessory tray module of the modular open space organizer (MOSO) system shown in FIGS. 2A-2G in accordance with an embodiment of the present invention.

FIG. 2N is a simplified rear, isometric view diagram of an accessory tray storage module 50A of the modular open space organizer (MOSO) system shown in FIGS. 2A-2G in accordance with an embodiment of the present invention. As shown in FIG. 2N, the storage module 50A arms 52A may also include a tab 53A to engage an arm opening 22A ramp 123 and nest in its recess 124 to securely engage the storage module 50A to a VMCC 30A. As also shown in FIG. 2N, the storage module 50A may include one or more wall sections 54A that may divide the storage module 50A into sub-modules. In an embodiment the storage module 50A may have an overall length of about 80 to 150 mm and about 116 mm in an embodiment. The storage module 50A may have an overall width of about 30 to 90 mm and about 61 mm in an embodiment. The storage module 50A may have an overall height of about 20 to 80 mm and about 37.5 mm in an embodiment.

Figure 2P:
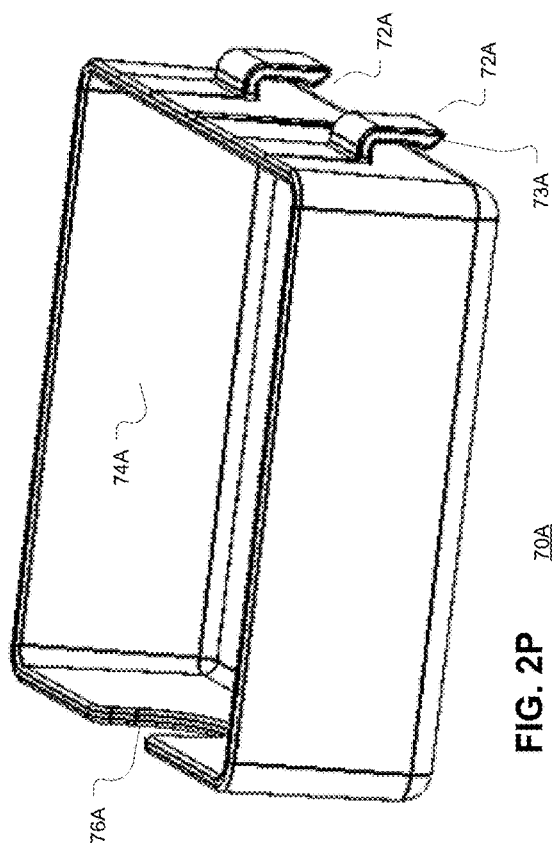
FIG. 2P is a simplified rear, isometric view diagram of a square tray module of the modular open space organizer (MOSO) system shown in FIGS. 2A-2G in accordance with an embodiment of the present invention.
Figure 2O:
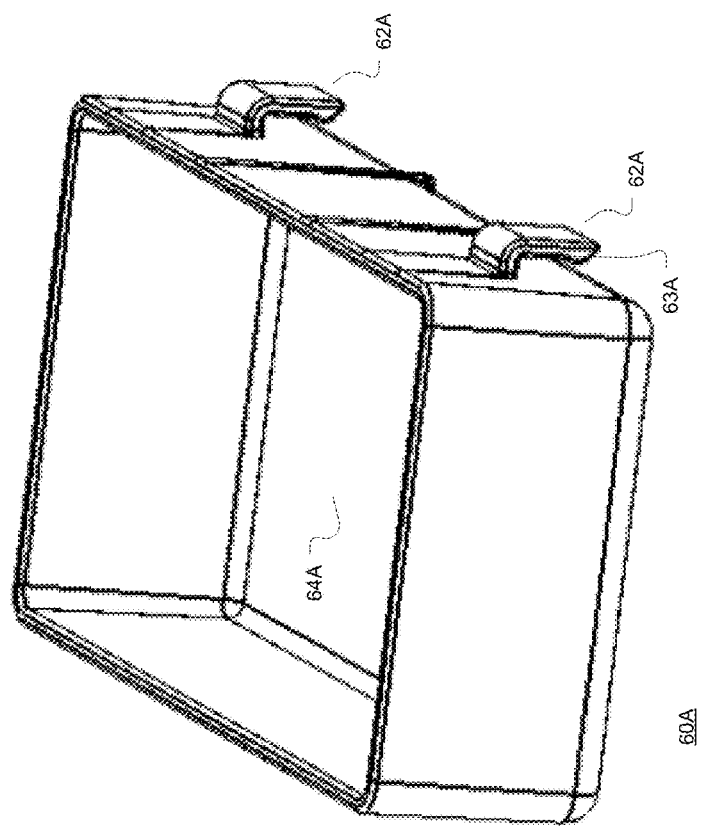
FIG. 2O is a simplified rear, isometric view diagram of a rectangular tray module of the modular open space organizer (MOSO) system shown in FIGS. 2A-2G in accordance with an embodiment of the present invention.

FIG. 2O is a simplified rear, isometric view diagram of a rectangular tray storage module 60A of the modular open space organizer (MOSO) system 10A shown in FIGS. 2A-2G in accordance with an embodiment of the present invention. As shown in FIG. 2O, the rectangular storage module 60A arms 62A may also include a tab 63A to engage an arm opening 22A ramp 123 and nest in its recess 124 to securely engage the rectangular storage module 60A to a VMCC 30A. In an embodiment the storage module 60A may have an overall length of about 120 to 250 mm and about 171 mm in an embodiment. The storage module 60A may have an overall width of about 40 to 100 mm and about 81 mm in an embodiment. The storage module 40A may have an overall height of about 25 to 70 mm and about 37.5 mm in an embodiment.

FIG. 2P is a simplified rear, isometric view diagram of a square tray storage module 70A of the modular open space organizer (MOSO) system 10A shown in FIGS. 2A-2G in accordance with an embodiment of the present invention. As shown in FIG. 2P, the square storage module 70A arms 72A may also include a tab 73A to engage an arm opening 22A ramp 123 and nest in its recess 124 to securely engage the square storage module 70A to a VMCC 30A. As also shown in FIG. 2P, the square storage module 70A may include a notch 76A in the front wall that enable a User to reach under objects stored in the square storage module 70A. In an embodiment the storage module 70A may have an overall length of about 90 to 150 mm and about 116 mm in an embodiment. The storage module 70A may have an overall width of about 60 to 150 mm and about 106 mm in an embodiment. The storage module 70A may have an overall height of about 25 to 70 mm and about 37.50 mm in an embodiment. The notch 76A may have a length of about 10 to 35 mm and about 25 mm and a height of about 10 to 30 mm and about 20 mm in an embodiment.

While this invention has been described in terms of a best mode for achieving the objectives of the invention, it will be appreciated by those skilled in the art that variations may be accomplished in view of these teachings without deviating from the spirit or scope of the present invention. As noted, the VMCC 20A and HREC 30A of a MOSO 10A may be modified based on the intended application, in particular, the size and shape of the open storage space 200A-200C where the MOSO 10A is to be employed. The MOSO 10B shown in FIGS. 4A-4D represents another embodiment where the VMCC 20B and HREC 30B may have different configuration to accommodate a different open storage space 200A-C, such as the space 200B. The storage modules 40A-70A may remain identical between systems 10A, 10B in an embodiment, reducing production and inventory costs.

Figure 4B:
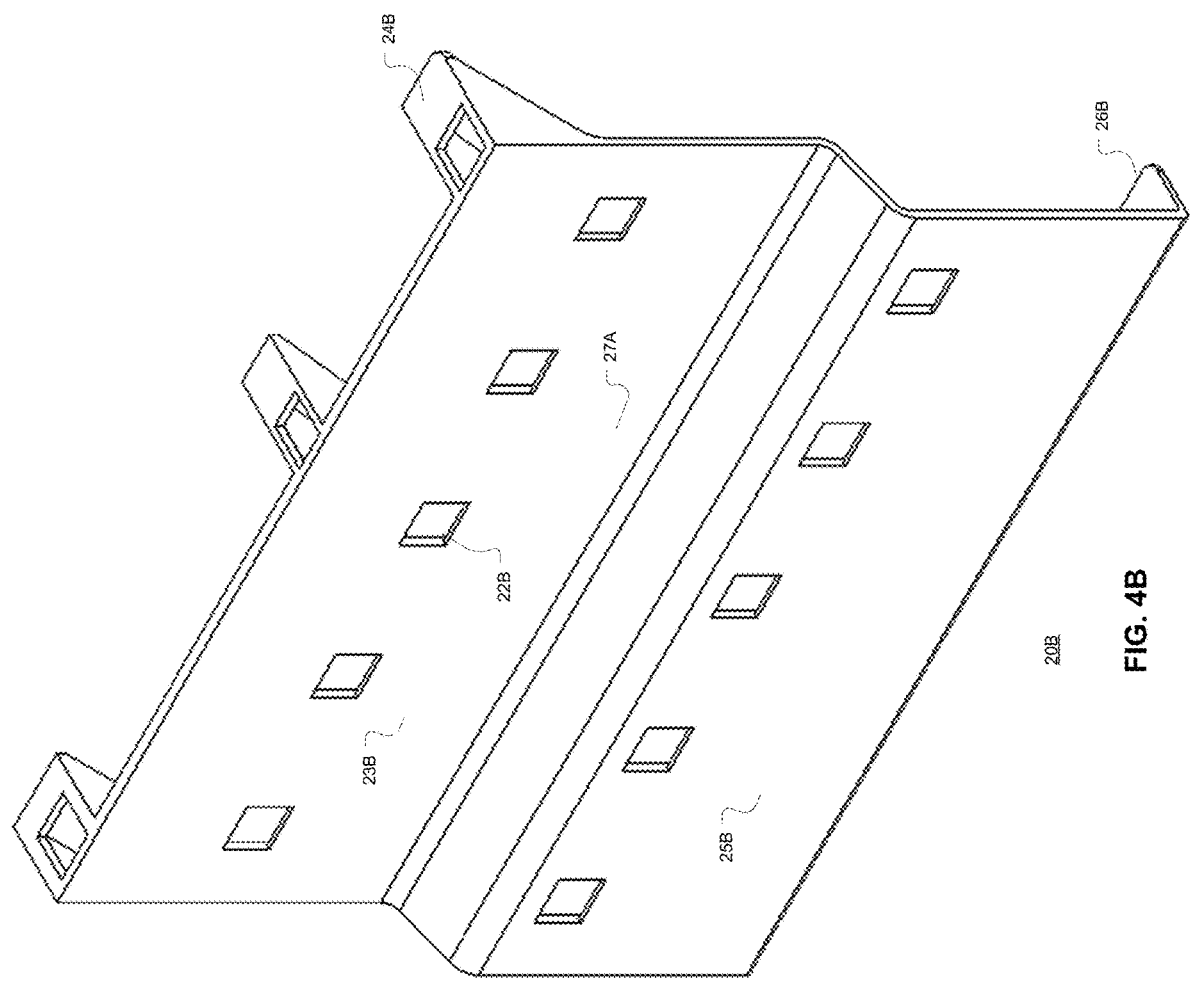
FIG. 4B is a simplified front, isometric view diagram of a vertical wall module of the modular open space organizer (MOSO) system shown in FIG. 4A in accordance with an embodiment of the present invention.
Figure 4D:
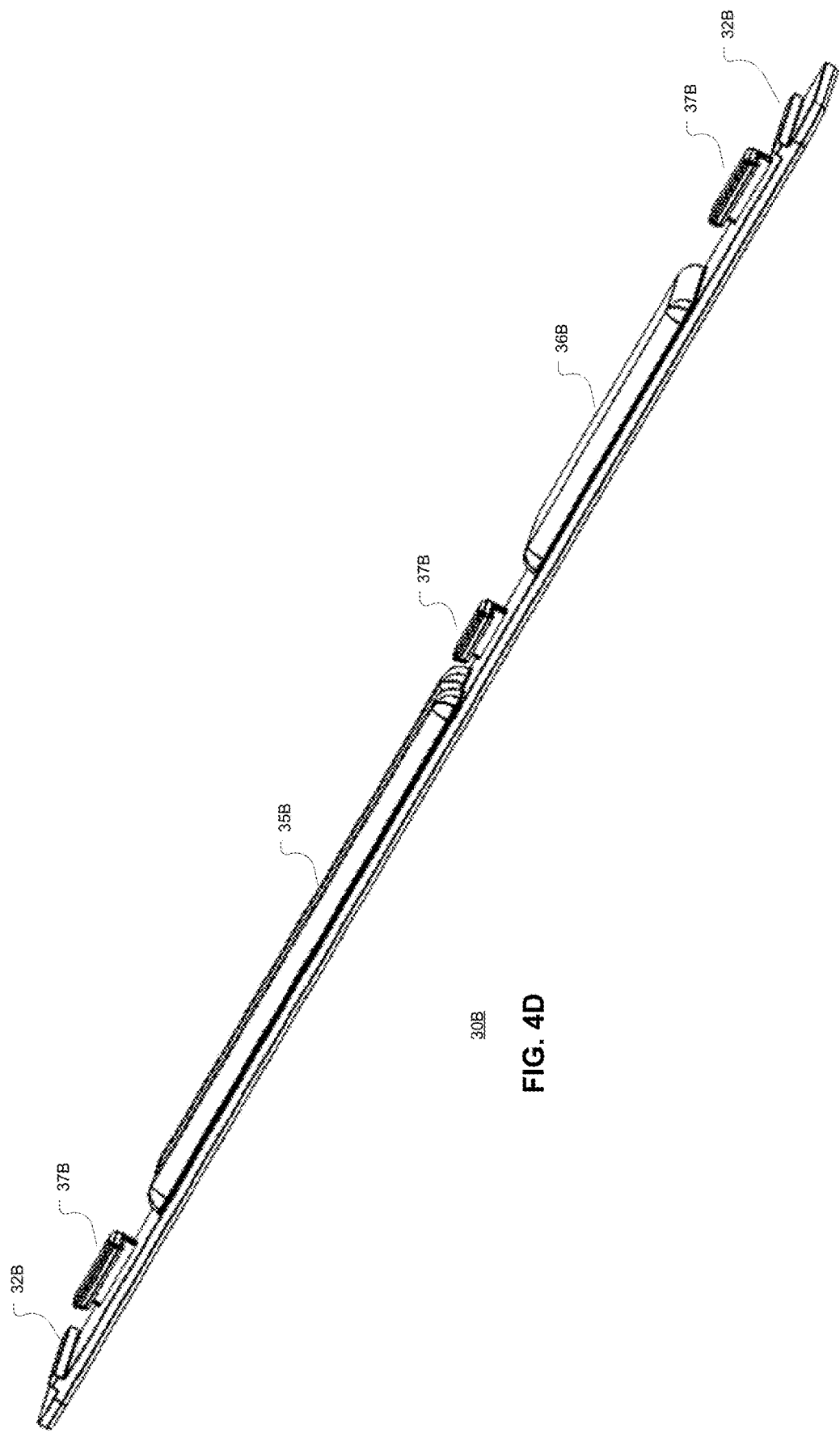
FIG. 4D is a simplified bottom, isometric view diagram of a horizontal module of the modular open space organizer (MOSO) system shown in FIG. 4A in accordance with an embodiment of the present invention.

In particular, FIGS. 4A, 5A, and 6 are simplified isometric diagrams of other modular open space organizer (MOSO) systems 10B-D in accordance with an embodiment of the present invention. FIG. 4B is a simplified front, isometric view diagram of a VMCC 20B of the modular open space organizer (MOSO) system 10B shown in FIG. 4A in accordance with an embodiment of the present invention. FIG. 4C is a simplified rear, isometric view diagram of the VMCC 20B of the modular open space organizer (MOSO) system 10B shown in FIG. 4A in accordance with an embodiment of the present invention. FIG. 4D is a simplified bottom, isometric view diagram of a horizontal module of the modular open space organizer (MOSO) system 10B shown in FIG. 4A in accordance with an embodiment of the present invention.

As shown in FIGS. 4A-4C, the MOSO system 10B VMCC 20B may include a planar upper section 23B and a planar lower section 25B where the lower section 25B is offset horizontally away from the left wall 27A relative to the upper section 23B. The offset between the sections 23B, 25B may match or mate with the internal cavity 206F of an open storage area 200A-C in an embodiment. As shown in FIG. 4C, the VMCC 20B may only include a horizontal extension 26B only along its bottom wall or foot. As shown in FIGS. 4A and 4D, the HREC 30B may not include perimeter offsets or insets and the rail groove tabs 32B may be wider and shorter than those of the HREC 32A to accommodate different grooves 204C of an open storage area 200A-C in an embodiment.

In an embodiment the HREC 30B rail groove engaging extensions 32B shown in FIG. 4D may be separated by about 200 to 400 mm and about 310 mm in an embodiment. The HREC 30B may have an overall length of about 250 to 450 mm and about 335 mm in an embodiment. The HREC 30B may have an overall width of about 30 to 80 mm and about 52.5 mm in an embodiment. The HREC 30B long insets 35B may have an overall length of about 80 to 150 mm and about 125 mm in an embodiment and may have an overall width of about 5 to 20 mm and about 11.5 mm in an embodiment. The HREC 30B rectangular inset 36B may have an overall length of about 40 to 110 mm and about 64.5 mm in an embodiment and may have an overall width of about 20 to 60 mm and about 41.5 mm in an embodiment.

FIG. 5A is a simplified isometric diagram of modular open space organizer (MOSO) system 10C in accordance with an embodiment of the present invention. As shown in FIG. 5A, the MOSO system 10C may also include a horizontal or top rail engaging component HREC 30C coupled to a vertical wall module coupling component (VMCC) 20C. One or more storage modules 40C, 50C, 60C, and 70C may be variable coupled to left wall of the VMCC 20C in an embodiment.

Figure 5C:
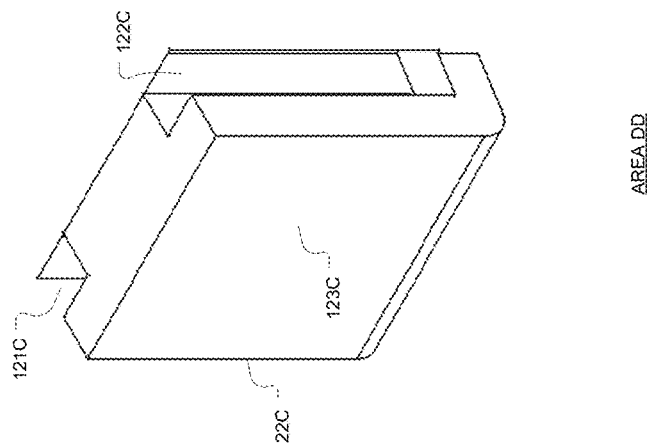
FIG. 5C is a simplified view of an enlarged area DD shown in FIG. 5B in accordance with an embodiment of the present invention.
Figure 5B:
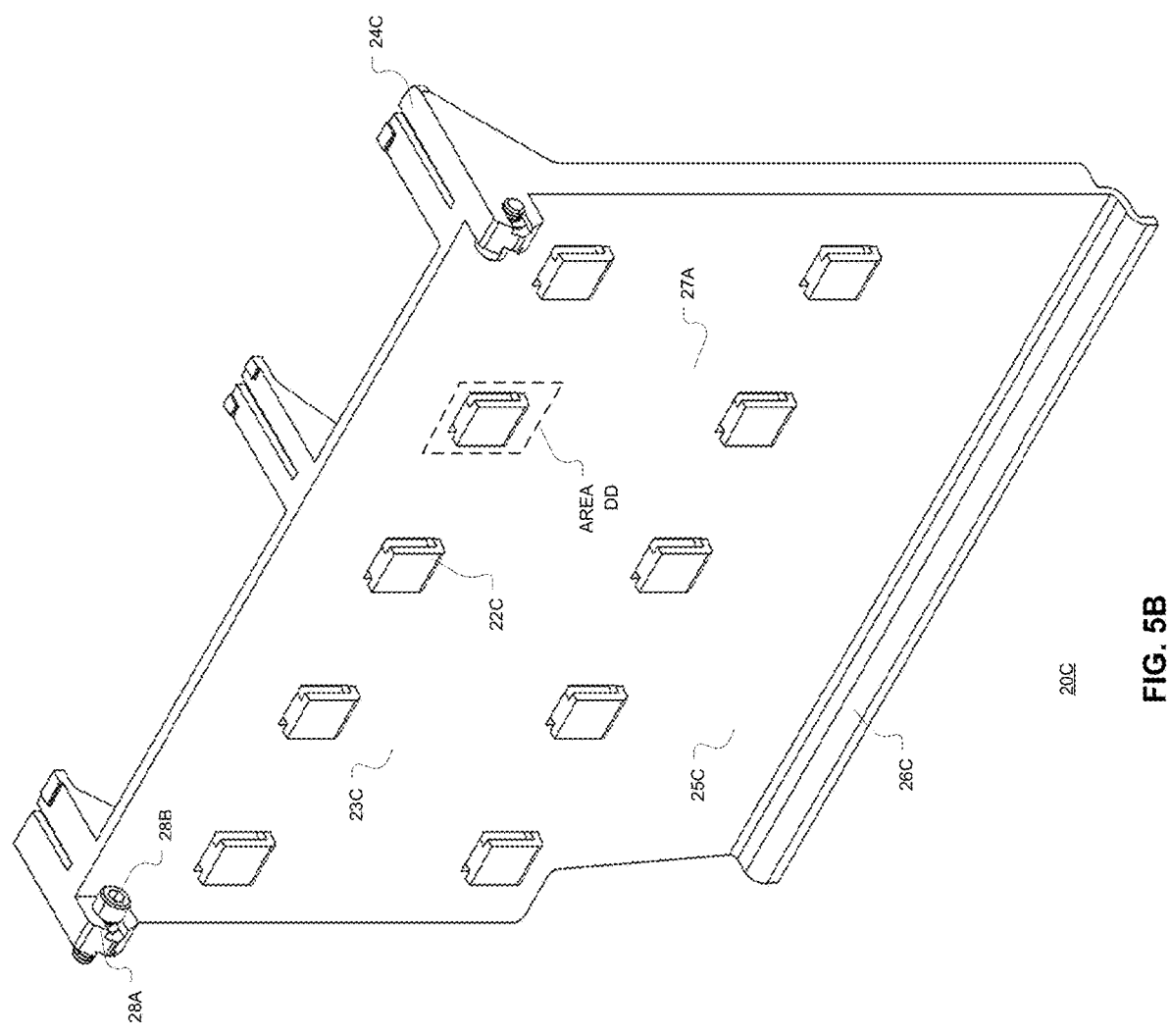
FIG. 5B is a simplified front, isometric view diagram of a vertical wall module of the modular open space organizer (MOSO) system shown in FIG. 5A in accordance with an embodiment of the present invention.

FIG. 5B is a simplified front, isometric view diagram of a vertical wall module coupling component (VMCC) of the modular open space organizer (MOSO) system 20C shown in FIG. 5A in accordance with an embodiment of the present invention. As shown in FIGS. 5A and 5B, the VMCC 20C may further include a rail engaging offset 28A with a rail engaging threaded member 28B. The combination 28A, 28B, enable a User to insert the MOSO system 10C into an open storage area (OSA) 200A-C with the threaded member(s) 28B retracted inward. A User may then advance one or more of the threaded members 28B via a tool interface (a inset hex shaped tool interface in an embodiment) to engage corresponding rails 204A-B of the OSA 200A-C. Such a configuration may enable a MOSO system 20C to remain securely coupled to an OSA 200A-C. In an embodiment, the rail engaging offset may be part of the HREC 30C. The rail engaging offset 28A with the rail engaging threaded member 28B combination may also be employed in the MOSO systems 10A, 10B in an embodiment.

As also shown in FIG. 5B, the VMCC 20C left wall 27A may included different elements to securely and configurably couple one or more modules 40C, 50C, 60C, and 70C. The VMCC 20C left wall 27A may include extensions 22C that mate with recesses (72C in FIG. 5H) in the one or more module 40C, 50C, 60C, and 70C. FIG. 5C is a simplified view of an enlarged area DD of an extension 22C shown in FIG. 5B in accordance with an embodiment of the present invention. As shown in FIG. 5B, the extension 22C may include a flat face 123C with one or more side channels 121C, 122C. FIG. 5D is a simplified rear, isometric view diagram of a vertical wall module of the modular open space organizer (MOSO) system shown in FIG. 5A in accordance with an embodiment of the present invention. FIG. 5E is a simplified view of an enlarged area EE of the rear section of an extension 22C shown in FIG. 5D in accordance with an embodiment of the present invention. As shown in FIGS. 5D and 5E, the rear section of an extension 22C may include one or more cavities 124C, 125C, and 126C. The cavities may be created during formation of the extension 22C (such as via an extrusion process) or to reduce material or weight.

In an embodiment, the elements that couple the VMCC 20C to a HREC 30C of the MOSO system 10C may also include a different configuration. The VMCC 20C may include three horizontal extension arm interfaces 24C where the middle interface 24C is shown in more detail in FIG. 5F. FIG. 5F is a simplified view of an enlarged area FF of the middle interface 24C shown in FIG. 5D in accordance with an embodiment of the present invention. As shown in FIG. 5F, the middle horizontal extension arm interface 24C may include two extensions 128C with a slit or gap 127C therebetween with raised registration tabs 129C at their distal ends.

FIG. 5G is a simplified bottom, isometric view diagram of a horizontal rail engaging module component (HREC) 30C of the modular open space organizer (MOSO) system shown in FIG. 5A in accordance with an embodiment of the present invention. As shown in FIG. 5G, the HREC 30C includes T-shaped vertical wall arms or extensions 37C that are shaped to engage the middle horizontal extension arm interface 24C two extensions 128C while passing through the slit or gap 127C. The HREC 30C may further include registration recesses 39C that align with the middle horizontal extension arm interface 24C distal end raised registration tabs 129C.

Figure 5I:
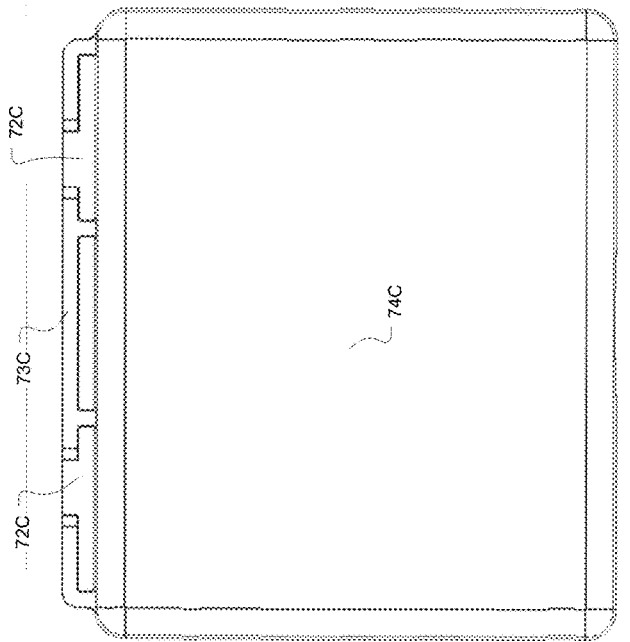
FIG. 5I is a simplified bottom view diagram of a square tray module of the modular open space organizer (MOSO) system shown in FIG. 5A in accordance with an embodiment of the present invention.
Figure 5K:
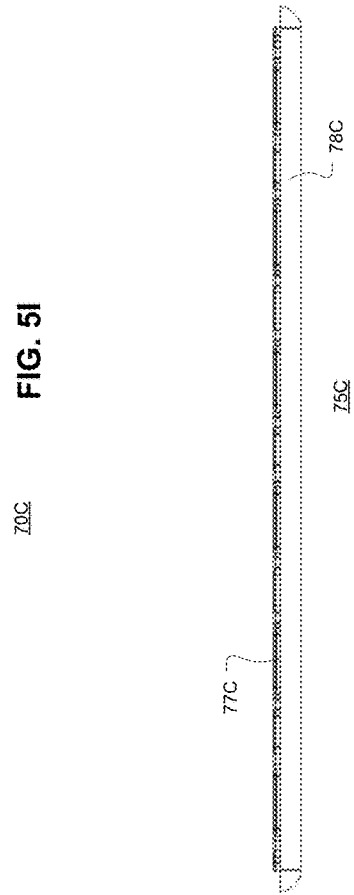
FIG. 5K is a simplified front side view diagram of a square tray module matt of the modular open space organizer (MOSO) system shown in FIG. 5A in accordance with an embodiment of the present invention.
Figure 5H:
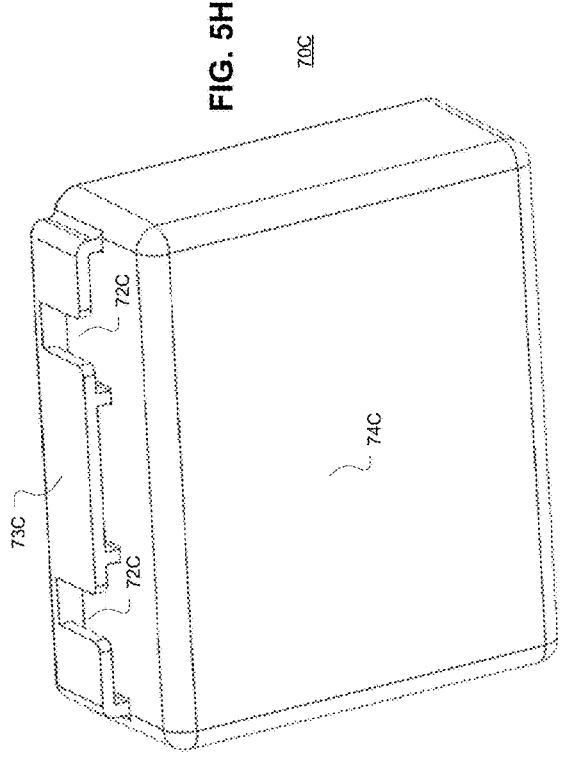
FIG. 5H is a simplified bottom, isometric view diagram of a square tray module of the modular open space organizer (MOSO) system shown in FIG. 5A in accordance with an embodiment of the present invention.

FIG. 5H is a simplified bottom, isometric view diagram of a square tray storage module 70C of the modular open space organizer (MOSO) system 10C shown in FIG. 5A in accordance with an embodiment of the present invention. FIG. 5I is a simplified bottom view diagram of a square tray storage module 70C of the modular open space organizer (MOSO) system 10C shown in FIG. 5A in accordance with an embodiment of the present invention. As shown in FIGS. 5H and 5I, the square tray storage module 70C may include a channel extension 73C with one or more channel slots 72C where the combination of extension 73C and slots 72C are shaped and sized to securely engage respective arm extensions 22C channels 121C, 122C of the VMCC 20C left wall 27A.

Figure 5J:
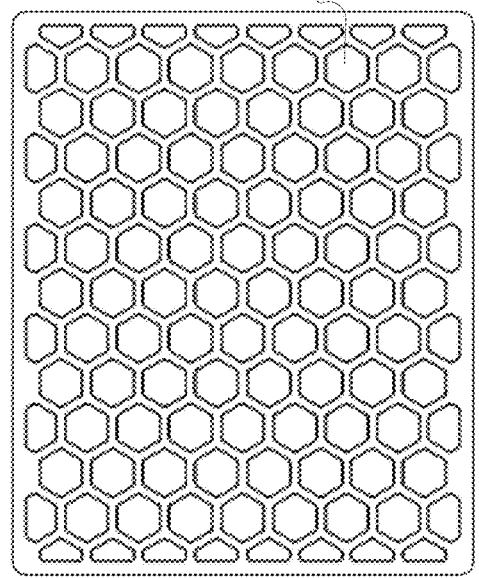
FIG. 5J is a simplified top side view diagram of a square tray module matt of the modular open space organizer (MOSO) system shown in FIG. 5A in accordance with an embodiment of the present invention.

FIG. 5J is a simplified top view diagram and FIG. 5K is a simplified front side view of a square tray storage module 70C patterned insert or matt 75C of the modular open space organizer (MOSO) system 10C shown in FIG. 5A in accordance with an embodiment of the present invention. As shown in FIG. 5A, one or more storage modules 40C, 50C, 60C, and 70C may include an insert or matt 75C in its bottom section. The insert or matt 75C may be securely placed or removably placed in a storage module 40C, 50C, 60C, and 70C or any storage module 40A, 50A, 60A, and 70A. As shown in FIGS. 5A, 5J, and 5K, the matt 75C may have a patterned, raised surface 77C (hexagonal pattern in an embodiment) over a base layer 78C. The matt 75C may be a pliable material including man-made (polymers or others) or natural material (EDPM or others) that limits the movement of items placed in the respective storage modules 40C, 50C, 60C, and 70C.

FIG. 6 is a simplified isometric diagram 10D of another modular open space organizer (MOSO) system 10D in accordance with an embodiment of the present invention. As shown in FIG. 6, the MOSO system 10D is similar to MOSO system 10C shown in FIG. 5A other than the HREC 30D. The HREC 30D has a different planar perimeter shape than the HREC 30C where the planar perimeter shape of the HREC 30A-30D may be configured to match with shape of the respective OSO 200A-C where the MOSO system 10A-10D is to be employed. For example, as shown in FIG. 3C, the OSO 200C may have formed corners 202A at an end. The HREC 30A-D planar shape may need to configured to engage the side walls of a such an OSO 200C.

The MOSO systems 10A-D may be formed of various materials including metals, alloys, polymers, wood, and composites of man-made and natural materials. In an embodiment, the MOSO systems 10A-D may formed of Acrylonitrile butadiene styrene or other thermoplastics via injection molding. In an embodiment, the MOSO systems 10A-10D may employed in a motorized vehicle including a car, SUV, and truck. In an embodiment, the MOSO systems 10A, 10C may configured to be employed in consoles of current Ford 2017 and future F-150, F-250, F-350 vehicles with the front bucket seat interior designed and Ford 2018 and future Expeditions. In an embodiment, the MOSO systems 10B, 10D may configured to be employed in consoles of General Motors (GM) 2015 full-size 1500, 2500, and 3500 pickup trucks with front bucket seats and 2015 and future versions of vehicles with similar center console including the Suburban, Tahoe, Yukon, Yukon XL, Denali, and Escalade.

What is claimed is:

1. An organizer fitting an open space of a console of a motorized vehicle, the open space having a shaped opening with a width, a length, and a depth, the organizer including:
   a vertical module, the vertical module including:
   a top;
   a bottom, the distance between the top and the bottom less than the open space depth;
   a front;
   a back, the distance between the front and back less than one of the open space width and the open space length;
   a left side, and
   a right side, the distance between the left side and right side substantially less than the other of the one of the open space width and the open space length; and
   a plurality of storage module connection elements between the top and the bottom of the vertical module, on one of the right side and the left side; and
   a storage module including a plurality of vertical module connection elements securely and removably couplable to a smaller plurality of the vertical module plurality of storage module connection elements,
   wherein the storage module may be securely and removably couplable to the one of the vertical module left side and right side at a plurality of locations and
   wherein each of the plurality of storage module connection elements comprises an extension and each of the plurality of vertical module connection elements comprises a mating recess.

2. The organizer according to claim 1, further comprising a plurality of storage modules, each comprising a plurality of vertical module connection elements securely and removably couplable to a smaller plurality of the vertical module plurality of storage module connection elements.

3. The organizer according to claim 1, wherein the plurality of storage module connection elements is on one of the right side and the left side on a horizontal row from the front and back.

4. The organizer according to claim 3, further comprising a plurality of storage module connection elements on one of the right side and the left side on a second horizontal row from the front and back.

5. The organizer according to claim 3, wherein the vertical module is substantially planar on the horizontal row from the front and back comprising a plurality of storage module connection elements and the vertical module is substantially planar on the second horizontal row from the front and back including a plurality of storage module connection elements.

6. The organizer according to claim 3, wherein the vertical module is substantially planar on the horizontal row from the front and back comprising a plurality of storage module connection elements.

7. The organizer according to claim 1, wherein each of the plurality of storage module connection elements comprises an extension with a vertical channel.

8. The organizer according to claim 1, wherein each of the plurality of storage module connection elements comprises an extension with a plurality of vertical channels.

9. The organizer according to claim 1, wherein the vertical module is substantially planar at locations comprising one of the plurality of storage module connection elements.

10. The organizer according to claim 1, wherein the open space has a rail with a groove along one of the width and the length and further comprising a horizontal module securely coupled to the top of the vertical module and comprising a rail extension sized to move within the groove of the rail.

11. The organizer according to claim 10, wherein the horizontal module is securely and removably couplable to the top of the vertical module.

12. The organizer according to claim 11, wherein the horizontal module comprises an extension and the top of the vertical module comprises a mating opening to enable the horizontal module to be securely and removably coupled to the top of the vertical module.

13. The organizer according to claim 10, wherein the vertical module further includes an edge extension and movable element configured to travel through the edge extension and engage a rail along one of the width and the length to securely hold the vertical module within the open area.

14. The organizer according to claim 1, wherein the open space comprises rails with a groove along one of the width and the length and further comprises a horizontal module securely coupled to the top of the vertical module and comprising a plurality of physically separate rail extension sized to move within the different open space rail groove.

15. The organizer according to claim 14, wherein the vertical module further comprises a plurality of edge extensions, each with movable elements configured to travel through the edge extension and engage a rail along one of the width and the length to securely hold the vertical module within the open area.

16. The organizer according to claim 1, wherein the motorized vehicle is a truck or SUV.

17. The organizer according to claim 1, wherein the motorized vehicle is a Ford F-150, F-250, F-350 or Expedition, or a General Motors 1500, 2500 or 3500 pickup trucks or Suburban, Tahoe, Yukon, Yukon XL, Denali, or Escalade.

* * * * *